United States Patent
Machita et al.

(10) Patent No.: US 8,023,230 B2
(45) Date of Patent: Sep. 20, 2011

(54) MAGNETORESISTIVE ELEMENT INCLUDING A PAIR OF FERROMAGNETIC LAYERS COUPLED TO A PAIR OF SHIELD LAYERS

(75) Inventors: Takahiko Machita, Tokyo (JP); Daisuke Miyauchi, Tokyo (JP); Yoshihiro Tsuchiya, Tokyo (JP); Tsutomu Chou, Tokyo (JP); Shinji Hara, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 564 days.

(21) Appl. No.: 12/289,401

(22) Filed: Oct. 27, 2008

(65) Prior Publication Data

US 2010/0103562 A1    Apr. 29, 2010

(51) Int. Cl.
*G11B 5/33* (2006.01)
(52) U.S. Cl. .................................... 360/313; G9B/5.104
(58) Field of Classification Search ................... 360/313; G9B/5.104
See application file for complete search history.

(56) References Cited

U.S. PATENT DOCUMENTS

| 6,724,583 | B2 | 4/2004 | Seigler et al. |
| 7,035,062 | B1 | 4/2006 | Mao et al. |
| 2004/0212932 | A1* | 10/2004 | Shimazawa et al. .......... 360/320 |
| 2006/0007603 | A1 | 1/2006 | Meguro et al. |
| 2006/0082929 | A1* | 4/2006 | Kiyono et al. ................. 360/317 |
| 2007/0195469 | A1* | 8/2007 | Takashita et al. ......... 360/324.12 |
| 2008/0253033 | A1* | 10/2008 | Ohta et al. ..................... 360/313 |
| 2009/0038143 | A1* | 2/2009 | Kagami et al. ............. 29/603.14 |
| 2010/0053819 | A1* | 3/2010 | Hirata et al. .................. 360/314 |

FOREIGN PATENT DOCUMENTS

| JP | A-2004-326853 | 11/2004 |
| JP | A-2006-24294 | 1/2006 |

\* cited by examiner

*Primary Examiner* — Hoai V Ho
(74) *Attorney, Agent, or Firm* — Oliff & Berridge, PLC

(57) ABSTRACT

A magnetoresistive element includes a pair of shield portions, and an MR stack and a bias magnetic field applying layer that are disposed between the pair of shield portions. The shield portions respectively include single magnetic domain portions. The MR stack includes a pair of ferromagnetic layers magnetically coupled to the pair of single magnetic domain portions, and a spacer layer disposed between the pair of ferromagnetic layers. The MR stack has a front end face, a rear end face and two side surfaces. The magnetoresistive element further includes two flux guide layers disposed between the pair of single magnetic domain portions and respectively adjacent to the two side surfaces of the MR stack. Each of the two flux guide layers has a front end face and a rear end face. The bias magnetic field applying layer has a front end face that faces the rear end face of the MR stack and the respective rear end faces of the two flux guide layers.

9 Claims, 16 Drawing Sheets

MAGNETORESISTIVE ELEMENT INCLUDING A PAIR OF FERROMAGNETIC LAYERS COUPLED TO A PAIR OF SHIELD LAYERS

BACKGROUND OF THE INVENTION

1. Field of the Invention

The present invention relates to a magnetoresistive element, and to a thin-film magnetic head, a head assembly and a magnetic disk drive each including the magnetoresistive element.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write head and a read head are stacked on a substrate, the write head incorporating an induction-type electromagnetic transducer for writing, the read head incorporating a magnetoresistive element (hereinafter, also referred to as MR element) for reading.

Examples of the MR element include a GMR (giant magnetoresistive) element utilizing a giant magnetoresistive effect, and a TMR (tunneling magnetoresistive) element utilizing a tunneling magnetoresistive effect.

Read heads are required to have characteristics of high sensitivity and high output. As the read heads that satisfy such requirements, those incorporating spin-valve GMR elements or TMR elements have been mass-produced.

A spin-valve GMR element and a TMR element each typically include a free layer, a pinned layer, a spacer layer disposed between the free layer and the pinned layer, and an antiferromagnetic layer disposed on a side of the pinned layer farther from the spacer layer. The free layer is a ferromagnetic layer having a magnetization that changes its direction in response to a signal magnetic field. The pinned layer is a ferromagnetic layer having a magnetization in a fixed direction. The antiferromagnetic layer is a layer that fixes the direction of the magnetization of the pinned layer by means of exchange coupling with the pinned layer. The spacer layer is a nonmagnetic conductive layer in a spin-valve GMR element, and is a tunnel barrier layer in a TMR element.

Examples of a read head incorporating a GMR element include one having a CIP (current-in-plane) structure in which a current used for detecting a signal magnetic field (hereinafter referred to as a sense current) is fed in the direction parallel to the planes of the layers constituting the GMR element, and one having a CPP (current-perpendicular-to-plane) structure in which the sense current is fed in a direction intersecting the planes of the layers constituting the GMR element, such as the direction perpendicular to the planes of the layers constituting the GMR element.

Read heads each incorporate a pair of shields sandwiching the MR element. The distance between the two shields is called a read gap length. Recently, with an increase in recording density, there have been increasing demands for a reduction in track width and a reduction in read gap length in read heads.

As an MR element capable of reducing the read gap length, there has been proposed an MR element including a pair of ferromagnetic layers each functioning as a free layer, and a spacer layer disposed between the pair of ferromagnetic layers (such an MR element is hereinafter referred to as an MR element of the three-layer structure), as disclosed in U.S. Pat. No. 7,035,062 B1, for example. In the MR element of the three-layer structure, the pair of ferromagnetic layers have magnetizations that are in directions antiparallel to each other and parallel to the track width direction when no external magnetic field is applied to those ferromagnetic layers, and that change their directions in response to an external magnetic field.

In a read head incorporating an MR element of the three-layer structure, a bias magnetic field is applied to the pair of ferromagnetic layers. The bias magnetic field changes the directions of the magnetizations of the pair of ferromagnetic layers so that each of the directions forms an angle of approximately 45 degrees with respect to the track width direction. As a result, the relative angle between the directions of the magnetizations of the pair of ferromagnetic layers becomes approximately 90 degrees. When a signal magnetic field sent from the recording medium is applied to the read head, the relative angle between the directions of the magnetizations of the pair of ferromagnetic layers changes, and the resistance of the MR element thereby changes. For this read head, it is possible to detect the signal magnetic field by detecting the resistance of the MR element. The read head incorporating an MR element of the three-layer structure allows a much greater reduction in read gap length, compared with a read head incorporating a conventional GMR element.

For an MR element of the three-layer structure, one of methods for directing the magnetizations of the pair of ferromagnetic layers antiparallel to each other when no external magnetic field is applied thereto is to antiferromagnetically couple the pair of ferromagnetic layers to each other by the RKKY interaction through the spacer layer.

Disadvantageously, however, this method imposes limitation on the material and thickness of the spacer layer to allow antiferromagnetic coupling between the pair of ferromagnetic layers. In addition, since this method limits the material of the spacer layer to a nonmagnetic conductive material, it is not applicable to a TMR element that is expected to have a high output, or a GMR element of a current-confined-path type CPP structure, which is an MR element also expected to have a high output and having a spacer layer that includes a portion allowing the passage of currents and a portion intercepting the passage of currents. The above-described method further has a disadvantage that, even if it could be possible to direct the magnetizations of the pair of ferromagnetic layers antiparallel to each other, it is difficult to direct those magnetizations parallel to the track width direction with reliability.

Under the circumstances, the inventors of the present application have contemplated providing a pair of shields to sandwich the MR element and controlling the directions of the magnetizations of the pair of ferromagnetic layers of the MR element by using the pair of shields. The pair of shields each include a fixed-magnetization portion in which the direction of the magnetization is fixed. The MR element is disposed between the respective fixed-magnetization portions of the pair of shields. The pair of ferromagnetic layers of the MR element are coupled to the fixed-magnetization portions of the pair of shields, whereby the directions of the magnetizations of the pair of ferromagnetic layers are controlled. An example of a shield including the fixed-magnetization portion may be one that is loop-shaped as a whole and that includes a portion formed of a hard magnetic layer, the remainder being formed of a soft magnetic layer.

The inventors of the present application have prototyped a read head in which the directions of the magnetizations of the pair of ferromagnetic layers of the MR element are controlled by the pair of shields as described above, and investigated the characteristic of this read head by performing a quasi static test on the read head. As a result, a phenomenon has been found to occur with high frequency in which the output of the read head abruptly changes to greatly deviate from its ideal value. This phenomenon is undesirable because it becomes a cause of noise in the output of the read head.

OBJECT AND SUMMARY OF THE INVENTION

It is an object of the present invention to provide a magnetoresistive element including a pair of ferromagnetic layers whose magnetizations change their directions in response to an external magnetic field, and a spacer layer disposed between the pair of ferromagnetic layers, the magnetoresistive element being capable of directing the magnetizations of the pair of ferromagnetic layers antiparallel to each other when no external magnetic field is applied, without making use of antiferromagnetic coupling between the pair of ferromagnetic layers through the spacer layer, and also capable of suppressing the occurrence of an abrupt change in output, and to provide a thin-film magnetic head, a head assembly and a magnetic disk drive each including such a magnetoresistive element.

A magnetoresistive element of the present invention includes a first shield portion, a second shield portion, an MR stack disposed between the first and second shield portions, and a bias magnetic field applying layer disposed between the first and second shield portions and applying a bias magnetic field to the MR stack. The first shield portion includes a first single magnetic domain portion that is in a single magnetic domain state such that a magnetization thereof is directed to a first direction. The second shield portion includes a second single magnetic domain portion that is in a single magnetic domain state such that a magnetization thereof is directed to a second direction. The first and second single magnetic domain portions and the MR stack are disposed such that the MR stack is sandwiched between the first and second single magnetic domain portions. The MR stack includes: a first ferromagnetic layer magnetically coupled to the first single magnetic domain portion; a second ferromagnetic layer magnetically coupled to the second single magnetic domain portion; and a spacer layer made of a nonmagnetic material and disposed between the first and second ferromagnetic layers. The MR stack has a front end face that receives a magnetic field to be detected, a rear end face opposite to the front end face, and two side surfaces connecting the front end face and the rear end face to each other. Each of the front end face, the rear end face and the two side surfaces is located at an end in a direction intersecting a direction in which the first ferromagnetic layer, the spacer layer and the second ferromagnetic layer are stacked.

The magnetoresistive element of the present invention further includes two flux guide layers each formed of a magnetic material, the two flux guide layers being disposed between the first and second single magnetic domain portions and respectively adjacent to the two side surfaces of the MR stack. Each of the two flux guide layers has a front end face facing toward the same direction as the front end face of the MR stack, and a rear end face opposite to the front end face. The bias magnetic field applying layer has a front end face facing the rear end face of the MR stack and the rear end face of each of the two flux guide layers, and applies the bias magnetic field to the first and second ferromagnetic layers so that the magnetizations of the first and second ferromagnetic layers change their directions compared with a state in which no bias magnetic field is applied to the first and second ferromagnetic layers.

According to the present invention, the two flux guide layers are disposed adjacent to the two side surfaces of the MR stack, respectively, and the bias magnetic field applying layer has the front end face that faces the rear end face of the MR stack and the rear end face of each of the two flux guide layers. As a result, the magnetic flux entering the first and second single magnetic domain portions from the bias magnetic field applying layer is reduced, and the first and second single magnetic domain portions thereby become magnetically stable.

In the magnetoresistive element of the present invention, the first direction and the second direction may be antiparallel to each other.

In the magnetoresistive element of the present invention, the bias magnetic field applying layer may apply the bias magnetic field to the first and second ferromagnetic layers so that the magnetizations of the first and second ferromagnetic layers are directed orthogonal to each other.

In the magnetoresistive element of the present invention, the MR stack may further include: a first coupling layer disposed between the first single magnetic domain portion and the first ferromagnetic layer and magnetically coupling the first ferromagnetic layer to the first single magnetic domain portion; and a second coupling layer disposed between the second single magnetic domain portion and the second ferromagnetic layer and magnetically coupling the second ferromagnetic layer to the second single magnetic domain portion. In this case, each of the first and second coupling layers may include a nonmagnetic conductive layer. Alternatively, at least one of the first and second coupling layers may include a magnetic layer, and two nonmagnetic conductive layers sandwiching the magnetic layer.

A thin-film magnetic head of the present invention includes: a medium facing surface that faces toward a recording medium; and the magnetoresistive element of the invention disposed near the medium facing surface to detect a signal magnetic field sent from the recording medium.

A head assembly of the present invention includes: a slider including the thin-film magnetic head of the invention and disposed to face toward the recording medium; and a supporter flexibly supporting the slider.

A magnetic disk drive of the present invention includes: a slider including the thin-film magnetic head of the invention and disposed to face toward a recording medium that is driven to rotate; and an alignment device supporting the slider and aligning the slider with respect to the recording medium.

According to the present invention, the first ferromagnetic layer of the MR stack is magnetically coupled to the first single magnetic domain portion of the first shield portion, and the second ferromagnetic layer of the MR stack is magnetically coupled to the second single magnetic domain portion of the second shield portion. The directions of the magnetizations of the first and second ferromagnetic layers are thereby controlled. The present invention thus makes it possible to direct the magnetizations of the pair of ferromagnetic layers antiparallel to each other when no external magnetic field is applied, without making use of antiferromagnetic coupling between the pair of ferromagnetic layers through the spacer layer.

Furthermore, according to the present invention, the two flux guide layers are disposed adjacent to the two side surfaces of the MR stack, respectively, and the bias magnetic field applying layer has the front end face that faces the rear end face of the MR stack and the rear end face of each of the two flux guide layers. As a result, it is possible to reduce the magnetic flux entering the first and second single magnetic domain portions from the bias magnetic field applying layer, and consequently the first and second single magnetic domain portions become magnetically stable. According to the present invention, it is thus possible to suppress the occurrence of an abrupt change in output of the magnetoresistive element.

Other and further objects, features and advantages of the present invention will appear more fully from the following description.

DETAILED DESCRIPTION OF THE PREFERRED EMBODIMENTS

First Embodiment

Figure 21:
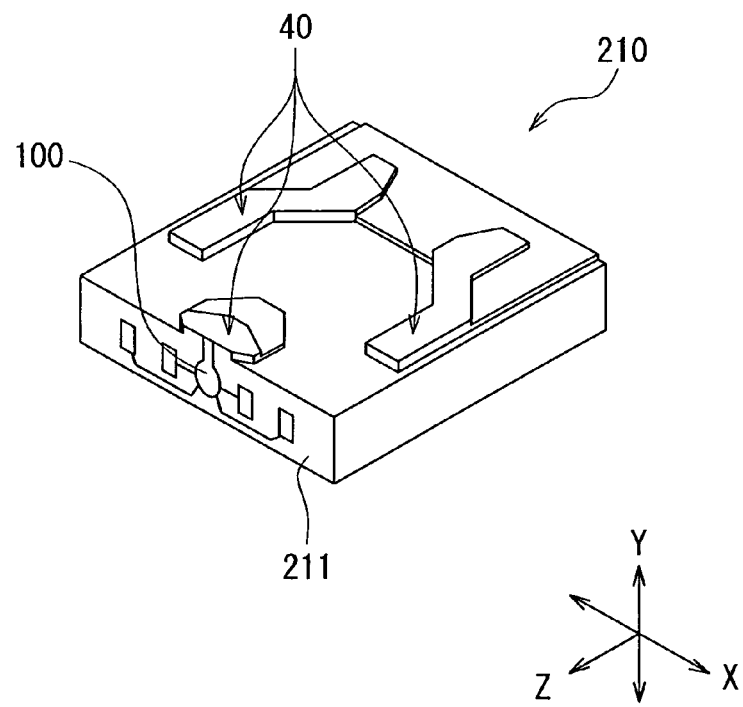
FIG. 21 is a perspective view of a slider including the thin-film magnetic head of the first embodiment of the invention.

Embodiments of the present invention will now be described in detail with reference to the drawings. Reference is first made to FIG. 21 to describe a slider 210 including a thin-film magnetic head of a first embodiment of the invention. In a magnetic disk drive, the slider 210 is placed to face toward a circular-plate-shaped recording medium (a magnetic disk platter) that is to be driven to rotate. In FIG. 21, the X direction is across the tracks of the recording medium, the Y direction is perpendicular to the surface of the recording medium, and the Z direction is the direction of travel of the recording medium as seen from the slider 210. The X, Y and Z directions are orthogonal to one another. The slider 210 has a base body 211. The base body 211 is nearly hexahedron-shaped. One of the six surfaces of the base body 211 is designed to face toward the surface of the recording medium. At this one of the six surfaces, there is formed a medium facing surface 40 to face toward the recording medium. When the recording medium rotates and travels in the Z direction, an airflow passing between the recording medium and the slider 210 causes a lift below the slider 210 in the Y direction of FIG. 21. This lift causes the slider 210 to fly over the surface of the recording medium. The thin-film magnetic head 100 of the present embodiment is formed near the air-outflow-side end (the end located at the lower left of FIG. 21) of the slider 210.

Figure 12:
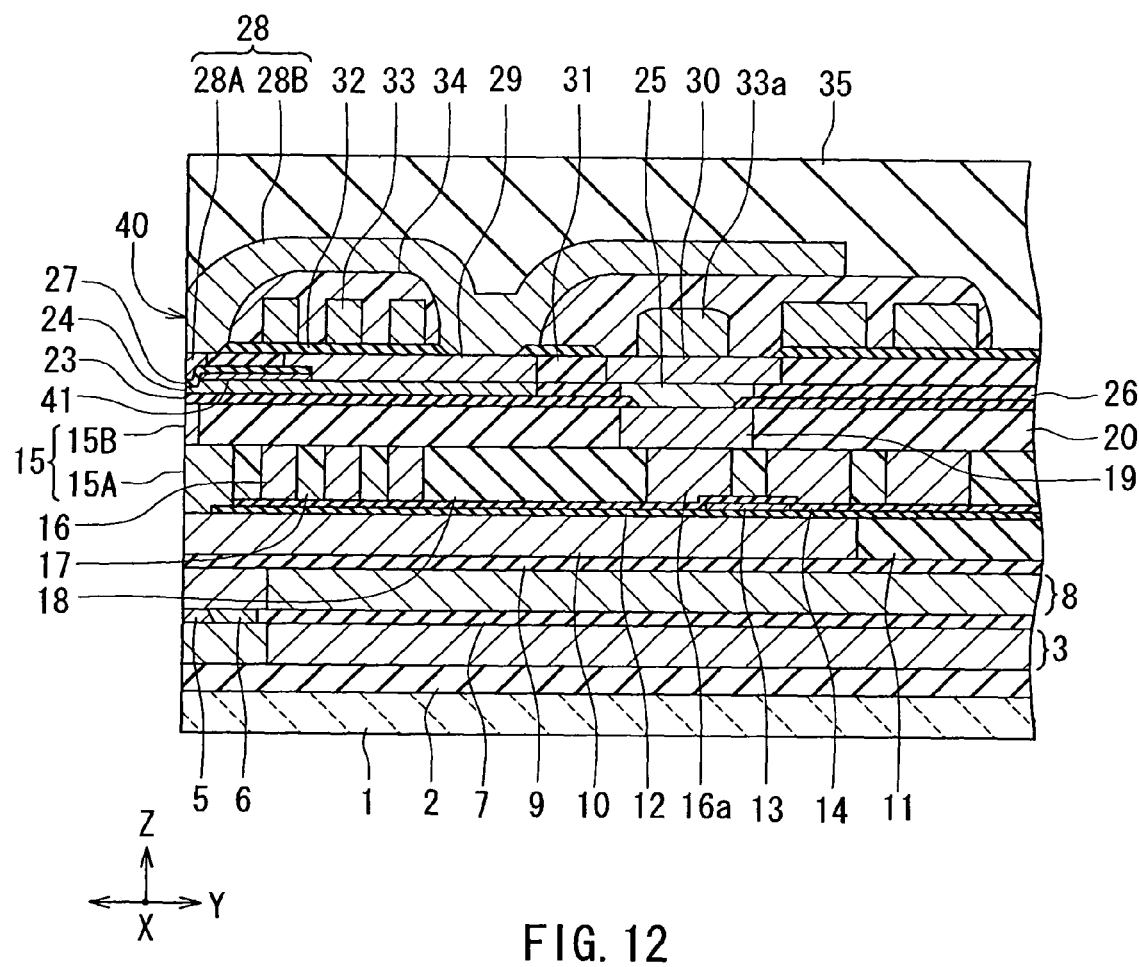
FIG. 12 is a cross-sectional view showing the configuration of a thin-film magnetic head of the first embodiment of the invention.
Figure 13:
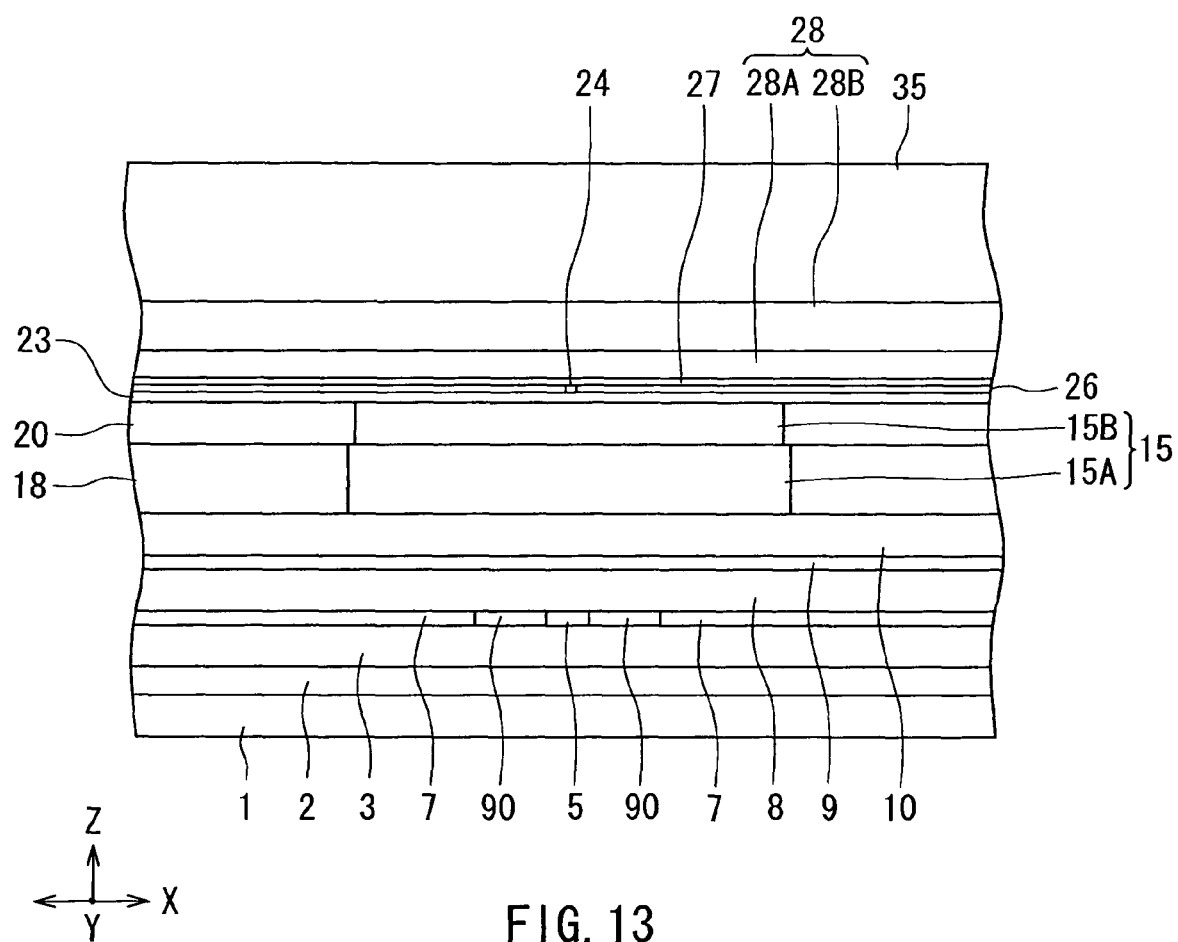
FIG. 13 is a front view showing the medium facing surface of the thin-film magnetic head of the first embodiment of the invention.

Reference is now made to FIG. 12 and FIG. 13 to describe the configuration of the thin-film magnetic head of the present embodiment. FIG. 12 is a cross-sectional view showing the configuration of the thin-film magnetic head. FIG. 13 is a front view showing the medium facing surface of the thin-film magnetic head. Note that FIG. 12 shows a cross section perpendicular to the medium facing surface and the top surface of the substrate. The X, Y and Z directions shown in FIG. 21 are also shown in FIG. 12 and FIG. 13. In FIG. 12 the X direction is orthogonal to the Y and Z directions. In FIG. 13 the Y direction is orthogonal to the X and Z directions.

As shown in FIG. 12, the thin-film magnetic head of the present embodiment has the medium facing surface 40 that faces toward the recording medium. As shown in FIG. 12 and FIG. 13, the thin-film magnetic head includes: a substrate 1 made of a ceramic material such as aluminum oxide-titanium carbide ($Al_2O_3$—TiC); an insulating layer 2 made of an insulating material such as alumina ($Al_2O_3$) and disposed on the substrate 1; a first read shield portion 3 disposed on the insulating layer 2; and an MR stack 5, two flux guide layers 90, a bias magnetic field applying layer 6 and an insulating refill layer 7 that are disposed on the first read shield portion 3.

The MR stack 5 has: a bottom surface touching the first read shield portion 3; a top surface opposite to the bottom surface; a front end face located in the medium facing surface 40 and receiving a magnetic field to be detected; a rear end face opposite to the front end face; and two side surfaces that are opposed to each other in the track width direction (the X direction of FIG. 13). The two flux guide layers 90 are disposed adjacent to the two side surfaces of the MR stack 5, respectively, with insulating films (not shown) provided between the MR stack 5 and the layers 90, respectively. The bias magnetic field applying layer 6 is disposed adjacent to the rear end face of the MR stack 5, with an insulating film (not shown) provided between the MR stack 5 and the layer 6. The insulating refill layer 7 is disposed around the MR stack 5, the two flux guide layers 90 and the bias magnetic field applying layer 6.

The thin-film magnetic head further includes: a second read shield portion 8 disposed on the MR stack 5, the bias magnetic field applying layer 6 and the insulating refill layer 7; and a separating layer 9 made of a nonmagnetic material such as alumina and disposed on the second read shield portion 8.

The portion from the first read shield portion 3 to the second read shield portion 8 constitutes a magnetoresistive element (hereinafter referred to as MR element) of the present embodiment. The MR element constitutes a read head of the thin-film magnetic head of the present embodiment. The configuration of the MR element will be described in detail later.

The thin-film magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The thin-film magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina.

The thin-film magnetic head further includes a first write shield 15 disposed on the magnetic layer 10. The first write shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example shown in FIG. 12, the length of the second layer 15B taken in the direction perpendicular to the medium facing surface 40 (the Y direction of FIG. 12) is smaller than the length of the first layer 15A taken in the direction perpendicular to the medium facing surface 40. However, the length of the second layer 15B taken in the direction perpendicular to the medium facing surface 40 may be equal to or greater than the length of the first layer 15A taken in the direction perpendicular to the medium facing surface 40.

The thin-film magnetic head further includes: a coil 16 made of a conductive material and disposed on the insulating film 14; an insulating layer 17 that fills the space between the coil 16 and the first layer 15A and the space between every adjacent turns of the coil 16; and an insulating layer 18 disposed around the first layer 15A, the coil 16 and the insulating layer 17. The coil 16 is planar spiral-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The thin-film magnetic head further includes: a connecting layer 19 made of a conductive material and disposed on the connecting portion 16a; and an insulating layer 20 made of an insulating material such as alumina and disposed around the second layer 15B and the connecting layer 19. The connecting layer 19 may be made of the same material as the second layer 15B. The second layer 15B, the connecting layer 19 and the insulating layer 20 have flattened top surfaces.

The thin-film magnetic head further includes a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The thin-film magnetic head further includes: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of the same material as the pole layer 24.

The thin-film magnetic head further includes a nonmagnetic layer 41 made of a nonmagnetic material and disposed on part of the top surface of the pole layer 24. The nonmagnetic layer 41 is made of an inorganic insulating material or a metal material, for example. Examples of the inorganic insulating material to be used for the nonmagnetic layer 41 include alumina and $SiO_2$. Examples of the metal material to be used for the nonmagnetic layer 41 include Ru and Ti.

The thin-film magnetic head further includes a second gap layer 27 disposed on part of the pole layer 24 and on the nonmagnetic layer 41. A portion of the top surface of the pole layer 24 apart from the medium facing surface 40 and the top surface of the connecting layer 25 are not covered with the nonmagnetic layer 41 and the second gap layer 27. The second gap layer 27 is made of a nonmagnetic material such as alumina.

The thin-film magnetic head further includes a second write shield 28 disposed on the second gap layer 27. The second write shield 28 includes: a first layer 28A disposed adjacent to the second gap layer 27; and a second layer 28B disposed on a side of the first layer 28A opposite to the second gap layer 27 and connected to the first layer 28A. The first layer 28A and the second layer 28B are made of a magnetic material. Each of the first layer 28A and the second layer 28B has an end face located in the medium facing surface 40.

The thin-film magnetic head further includes: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of the same material as the first layer 28A. The first layer 28A, the yoke layer 29, the connecting layer 30 and the insulating layer 31 have flattened top surfaces.

The thin-film magnetic head further includes an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The thin-film magnetic head further includes a coil 33 made of a conductive material and disposed on the insulating layer 32. The coil 33 is planar spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The thin-film magnetic head further includes an insulating layer 34 disposed to cover the coil 33. The insulating layer 34 is made of photoresist, for example. The second layer 28B of the second write shield 28 is disposed on the first layer 28A, the yoke layer 29 and the insulating layer 34, and connects the first layer 28A and the yoke layer 29 to each other.

The thin-film magnetic head further includes an overcoat layer 35 made of an insulating material such as alumina and disposed to cover the second layer 28B. The portion from the magnetic layer 10 to the second layer 28B constitutes a write head. The base body 211 of FIG. 21 is mainly composed of the substrate 1 and the overcoat layer 35 of FIG. 12.

As described so far, the thin-film magnetic head includes the medium facing surface 40 that faces toward the recording medium, the read head, and the write head. The read head and the write head are stacked on the substrate 1. The read head is disposed backward along the direction of travel of the recording medium (the Z direction) (in other words, disposed closer to an air-inflow end of the slider), while the write head is disposed forward along the direction of travel of the recording medium (the Z direction) (in other words, disposed closer to an air-outflow end of the slider). The thin-film magnetic head writes data on the recording medium through the use of the write head, and reads data stored on the recording medium through the use of the read head.

As shown in FIG. 12 and FIG. 13, the read head includes the first read shield portion 3, the second read shield portion 8, the MR stack 5 that is disposed between the first and second read shield portions 3 and 8 near the medium facing surface 40 in order to detect a signal magnetic field sent from the recording medium, and the two flux guide layers 90, the bias magnetic field applying layer 6 and the insulating refill layer 7 that are disposed between the first and second read shield portions 3 and 8. The two flux guide layers 90 are disposed adjacent to the two side surfaces of the MR stack 5, respectively, with insulating films (not shown) provided between the MR stack 5 and the layers 90, respectively. The bias magnetic field applying layer 6 is disposed adjacent to the rear end face of the MR stack 5, with an insulating film (not shown) provided between the MR stack 5 and the layer 6. The insulating refill layer 7 is disposed around the MR stack 5, the two flux guide layers 90 and the bias magnetic field applying layer 6. The MR stack 5 is either a TMR element or a GMR element of the CPP structure. A sense current is fed to the MR stack 5 in a direction intersecting the planes of layers constituting the MR stack 5, such as the direction perpendicular to the planes of the layers constituting the MR stack 5. The resistance of the MR stack 5 changes in response to an external magnetic field, that is, a signal magnetic field sent from the recording medium. The resistance of the MR stack 5 can be determined from the sense current. It is thus possible, using the read head, to read data stored on the recording medium.

The write head includes the magnetic layer 10, the first write shield 15, the coil 16, the first gap layer 23, the pole layer 24, the nonmagnetic layer 41, the second gap layer 27, the second write shield 28, the yoke layer 29, and the coil 33. The first write shield 15 is located closer to the substrate 1 than is the second write shield 28. The pole layer 24 is located closer to the substrate 1 than is the second write shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of a perpendicular magnetic recording system.

The first write shield 15 is made of a magnetic material, and has an end face located in the medium facing surface 40 at a position backward of the end face of the pole layer 24 along the direction of travel of the recording medium (the Z direction). The first gap layer 23 is made of a nonmagnetic material, has an end face located in the medium facing surface 40, and is disposed between the first write shield 15 and the pole layer 24. In the present embodiment, the first write shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The magnetic layer 10 has a function of returning a magnetic flux that has been generated from the end face of the pole layer 24 and has magnetized the recording medium. FIG. 12 shows an example in which the magnetic layer 10 has an end face located in the medium facing surface 40. However, since the magnetic layer 10 is connected to the first write shield 15 having an end face located in the medium facing surface 40, the magnetic layer 10 may have an end face that is closer to the medium facing surface 40 and located at a distance from the medium facing surface 40.

In the medium facing surface 40, the end face of the first write shield 15 (the end face of the second layer 15B) is located backward of the end face of the pole layer 24 along the direction of travel of the recording medium (the Z direction) (in other words, located closer to the air-inflow end of the slider) with a predetermined small distance provided therebetween by the first gap layer 23. The distance between the end face of the pole layer 24 and the end face of the first write shield 15 in the medium facing surface 40 is preferably within a range of 0.05 to 0.7 µm, or more preferably within a range of 0.1 to 0.3 µm.

The first write shield 15 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density.

The second write shield 28 is made of a magnetic material, and has an end face located in the medium facing surface 40 at a position forward of the end face of the pole layer 24 along the direction of travel of the recording medium (the Z direction). The second gap layer 27 is made of a nonmagnetic material, has an end face located in the medium facing surface 40, and is disposed between the second write shield 28 and the pole layer 24. In the present embodiment, the second write shield 28 includes: the first layer 28A disposed adjacent to the second gap layer 27; and the second layer 28B disposed on a side of the first layer 28A opposite to the second gap layer 27 and connected to the first layer 28A. Part of the coil 33 is disposed to pass through the space surrounded by the pole layer 24 and the second write shield 28. The second write shield 28 is connected to a portion of the yoke layer 29 away from the medium facing surface 40. The second write shield 28 is thus connected to a portion of the pole layer 24 away from the medium facing surface 40 through the yoke layer 29. The pole layer 24, the second write shield 28 and the yoke layer 29 form a magnetic path that allows a magnetic flux corresponding to the magnetic field generated by the coil 33 to pass therethrough.

In the medium facing surface 40, the end face of the second write shield 28 (the end face of the first layer 28A) is located forward of the end face of the pole layer 24 along the direction of travel of the recording medium (the Z direction) (in other words, located closer to the air-outflow end of the slider) with a predetermined small distance provided therebetween by the second gap layer 27. The distance between the end face of the pole layer 24 and the end face of the second write shield 28 in the medium facing surface 40 is preferably equal to or smaller than 200 nm, or more preferably within a range of 25 to 50 nm, so that the second write shield 28 can fully exhibit its function as a shield.

The position of the end of a bit pattern to be written on the recording medium is determined by the position of an end of the pole layer 24 closer to the second gap layer 27 in the medium facing surface 40. The second write shield 28 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density. Furthermore, the second write shield 28 takes in a disturbance magnetic field applied from outside the thin-film magnetic head to the thin-film magnetic head. It is thereby possible to prevent erroneous writing on the recording medium caused by the disturbance magnetic field intensively taken into the pole layer 24. The second write shield 28 also has a function of returning a magnetic flux that has been generated from the end face of the pole layer 24 and has magnetized the recording medium.

FIG. 12 shows an example in which neither the magnetic layer 10 nor the first write shield 15 is connected to the pole layer 24. However, the magnetic layer 10 may be connected to a portion of the pole layer 24 away from the medium facing surface 40. The coil 16 is not an essential component of the write head and can be dispensed with. In the example shown in FIG. 12, the yoke layer 29 is disposed on the pole layer 24, or in other words, disposed forward of the pole layer 24 along the direction of travel of the recording medium (the Z direction) (or in still other words, disposed closer to the air-outflow end of the slider). However, the yoke layer 29 may be disposed below the pole layer 24, or in other words, disposed backward of the pole layer 24 along the direction of travel of the recording medium (the Z direction) (or in still other words, disposed closer to the air-inflow end of the slider).

The heater 13 is provided for heating the components of the write head including the pole layer 24 so as to control the distance between the recording medium and the end face of the pole layer 24 located in the medium facing surface 40. Two leads that are not shown are connected to the heater 13. For example, the heater 13 is formed of a NiCr film or a layered film made up of a Ta film, a NiCu film and a Ta film. The heater 13 generates heat by being energized through the two leads, and thereby heats the components of the write head. As a result, the components of the write head expand and the end face of the pole layer 24 located in the medium facing surface 40 thereby gets closer to the recording medium.

While FIG. 12 and FIG. 13 show a write head for a perpendicular magnetic recording system, the write head of the present embodiment may be one for a longitudinal magnetic recording system.

A method of manufacturing the thin-film magnetic head of the present embodiment will now be outlined. In the method of manufacturing the thin-film magnetic head of the embodiment, first, components of a plurality of thin-film magnetic heads are formed on a single substrate (wafer) to thereby fabricate a substructure in which pre-slider portions each of which will later become a slider are aligned in a plurality of rows. Next, the substructure is cut to form a slider aggregate including a plurality of pre-slider portions aligned in a row. Next, a surface formed in the slider aggregate by cutting the substructure is lapped to thereby form the medium facing surfaces 40 of the pre-slider portions included in the slider aggregate. Next, flying rails are formed in the medium facing surfaces 40. Next, the slider aggregate is cut so as to separate the plurality of pre-slider portions from one another, whereby a plurality of sliders are formed, each of the sliders including the thin-film magnetic head.

Figure 1:
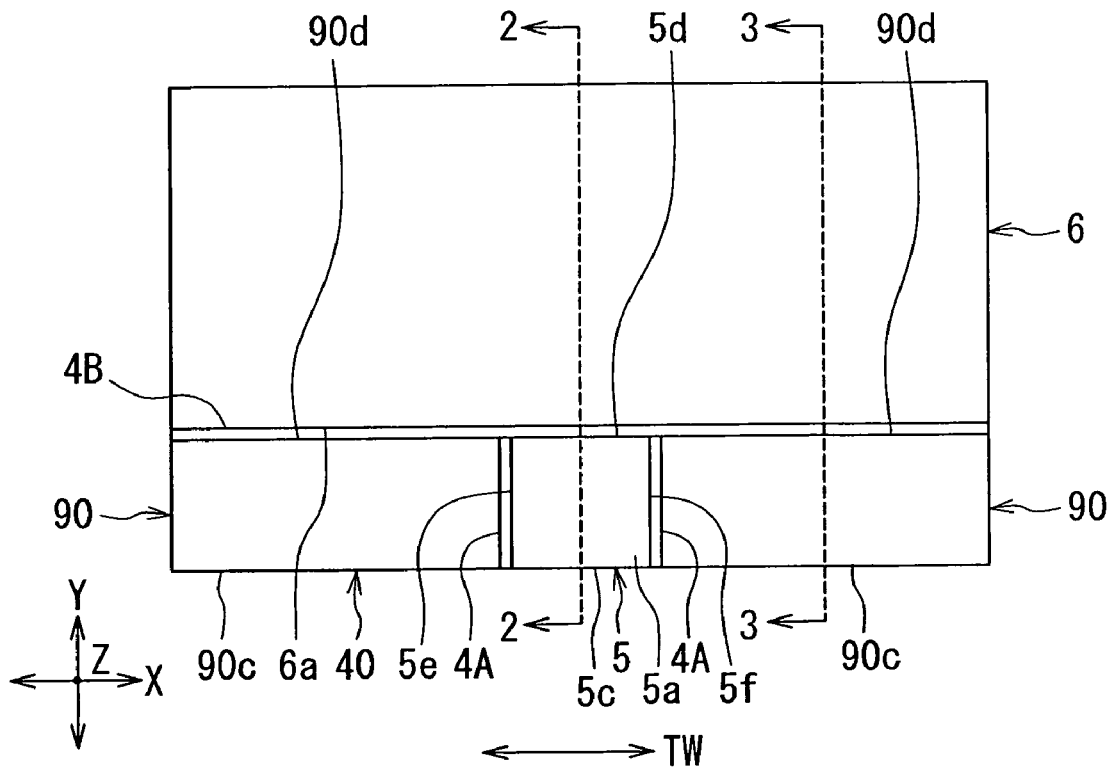
FIG. 1 is a plan view of a main part of a magnetoresistive element of a first embodiment of the invention.
Figure 2:
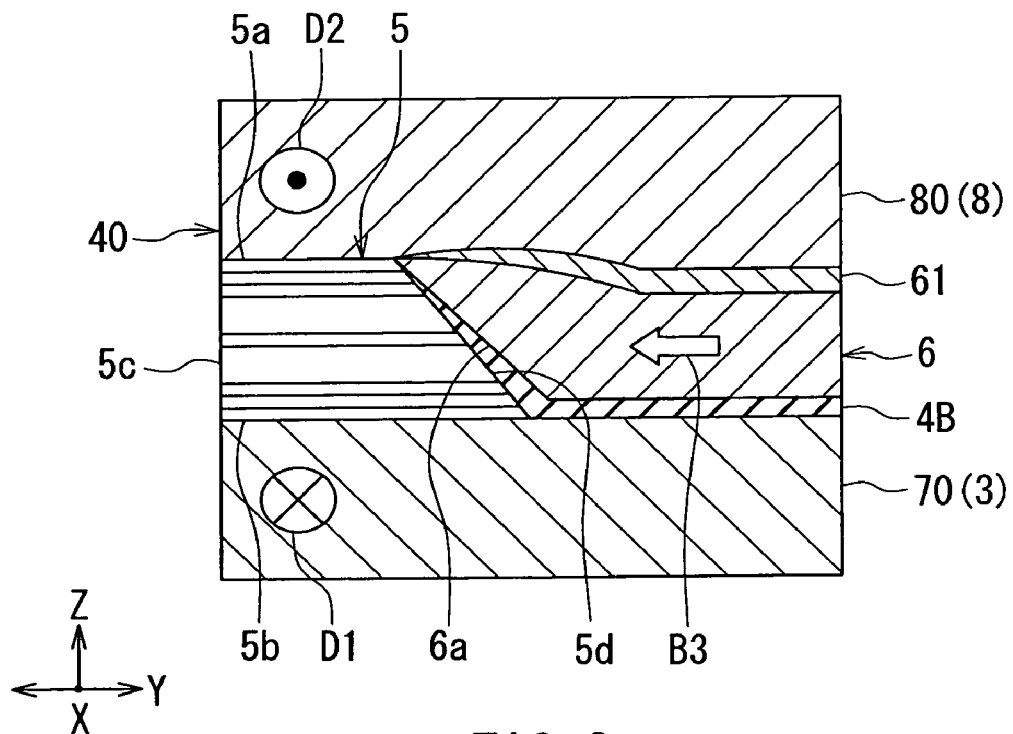
FIG. 2 is a cross-sectional view showing a cross section of the magnetoresistive element of the first embodiment of the invention taken along line 2-2 of FIG. 1.
Figure 3:
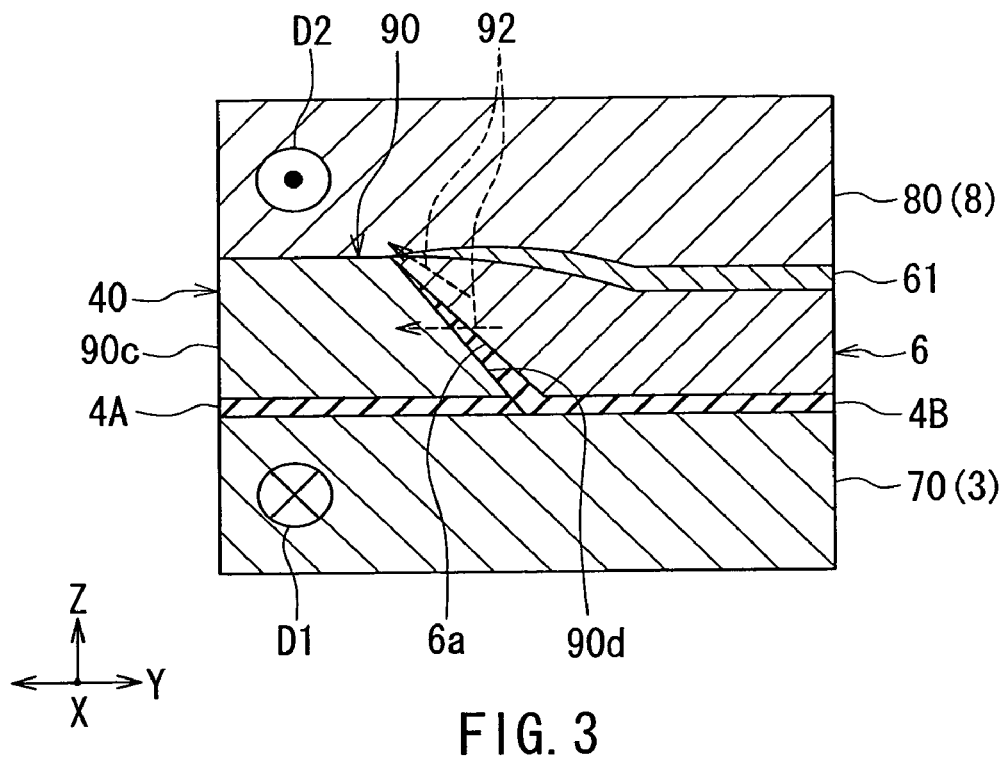
FIG. 3 is a cross-sectional view showing a cross section of the magnetoresistive element of the first embodiment of the invention taken along line 3-3 of FIG. 1.
Figure 4:
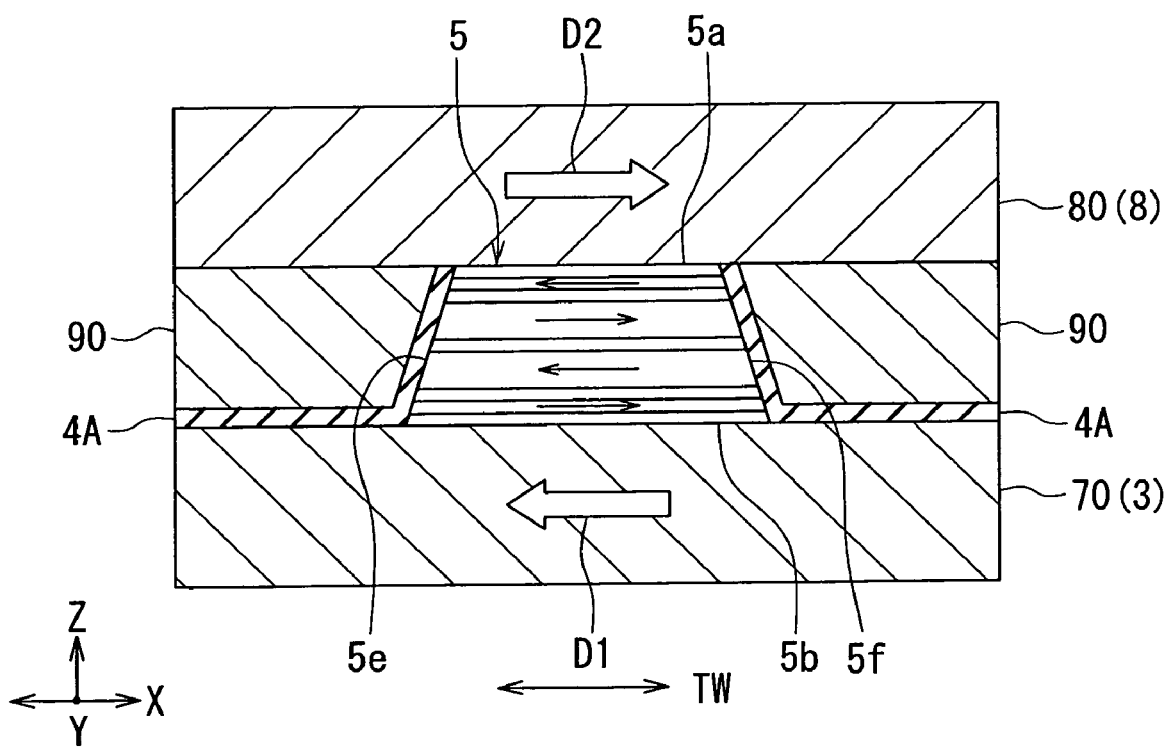
FIG. 4 is a cross-sectional view showing a cross section of the magnetoresistive element of the first embodiment of the invention parallel to the medium facing surface.
Figure 5:
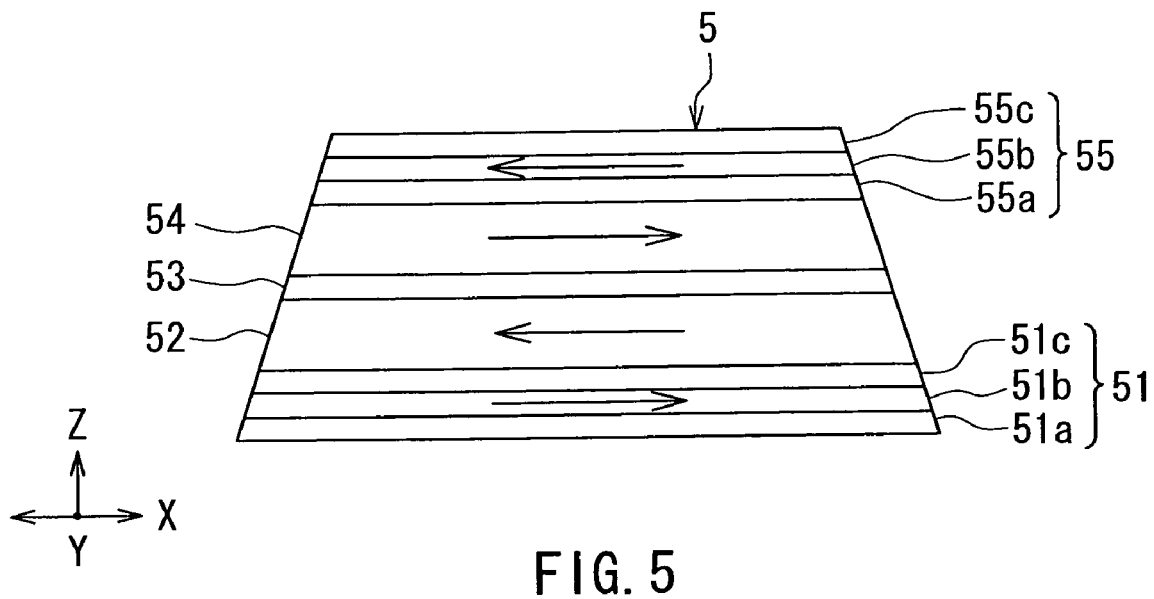
FIG. 5 is an enlarged cross-sectional view of the MR stack of FIG. 4.
Figure 6:
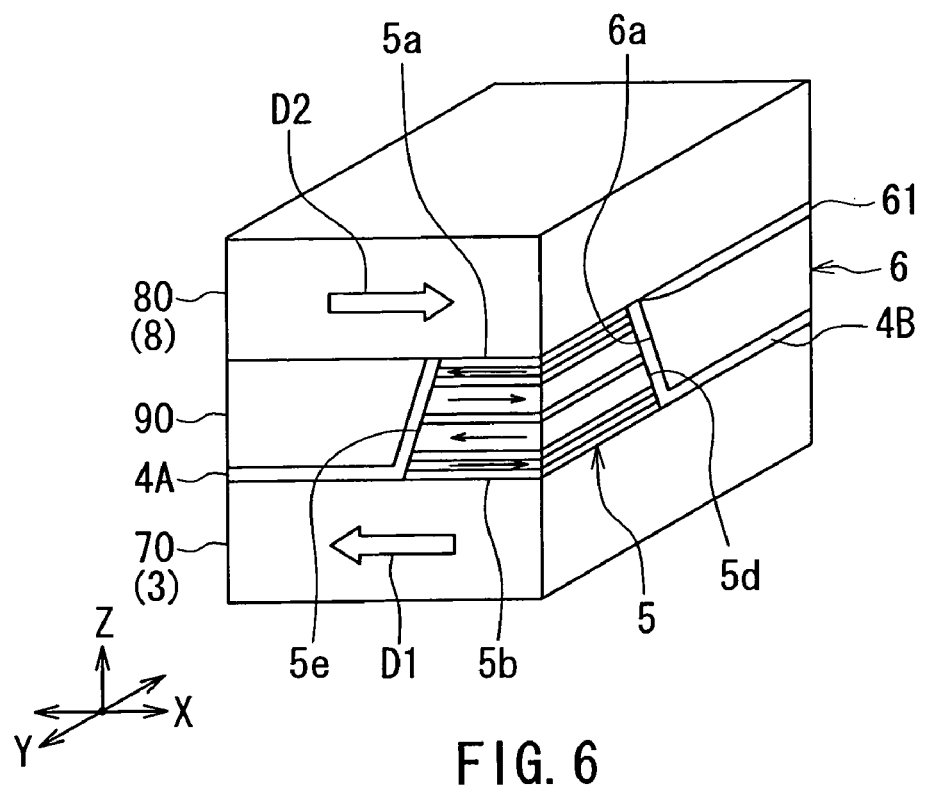
FIG. 6 is a perspective view of the main part of the magnetoresistive element of the first embodiment of the invention.
Figure 7:
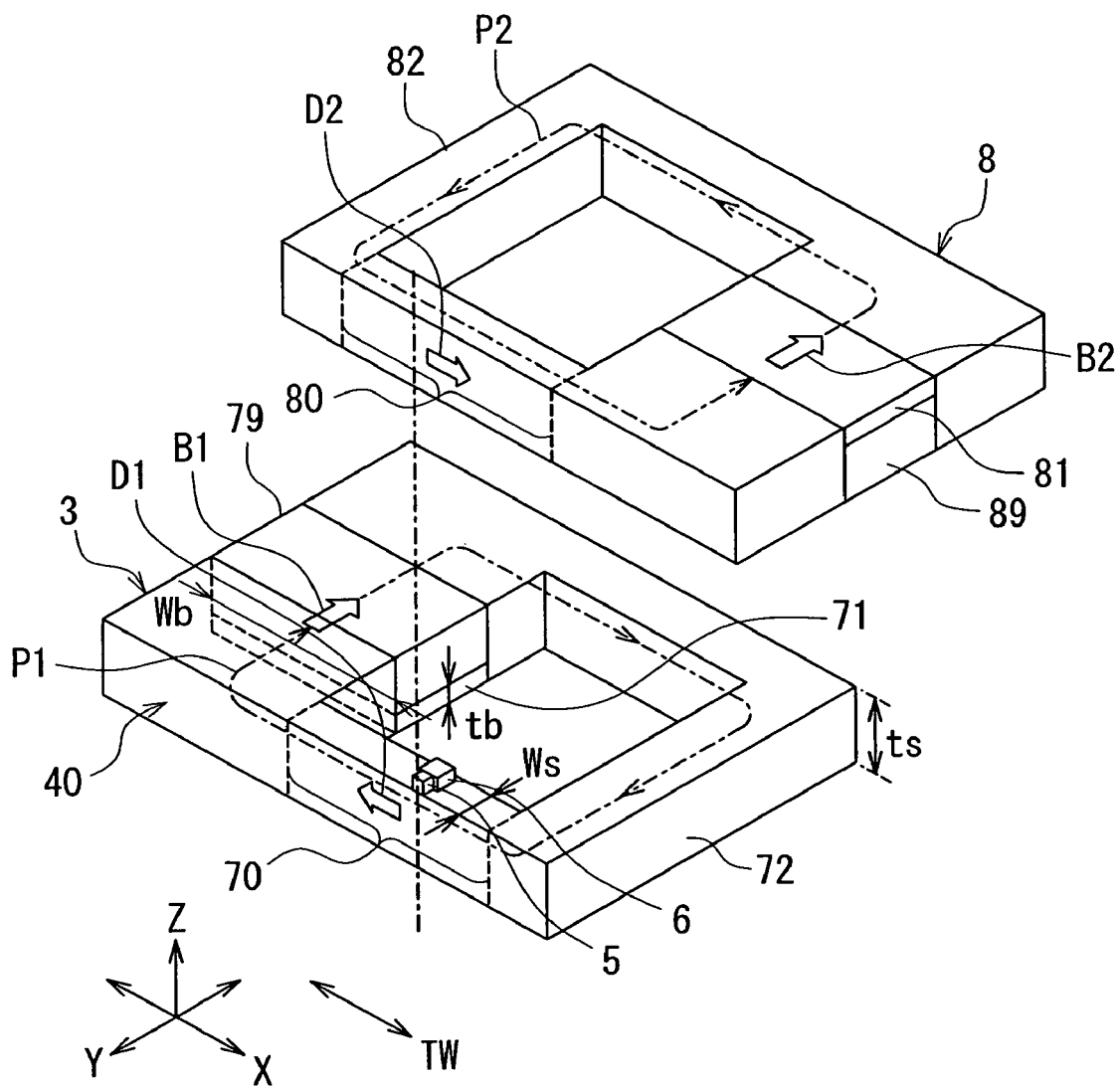
FIG. 7 is an exploded perspective view of the main part of the magnetoresistive element of the first embodiment of the invention.

The configuration of the MR element of the present embodiment will now be described in detail with reference to FIG. 1 to FIG. 7. FIG. 1 is a plan view of a main part of the MR element. FIG. 2 is a cross-sectional view showing a cross section of the MR element taken along line 2-2 of FIG. 1. FIG. 3 is a cross-sectional view showing a cross section of the MR element taken along line 3-3 of FIG. 1. FIG. 4 is a cross-sectional view showing a cross section of the MR element parallel to the medium facing surface. FIG. 5 is an enlarged cross-sectional view of the MR stack of FIG. 4. FIG. 6 is a perspective view, partially cut away, of the main part of the MR element. FIG. 7 is an exploded perspective view of the main part of the MR element. The X, Y and Z directions shown in FIG. 21 are also shown in FIG. 1 to FIG. 7. In FIG. 1 the Z direction is orthogonal to the X and Y directions. In FIG. 2 and FIG. 3 the X direction is orthogonal to the Y and Z directions. In FIG. 4 and FIG. 5 the Y direction is orthogonal to the X and Z directions. In FIG. 1 and FIG. 4 the arrow TW indicates the track width direction. The track width direction TW is the same as the X direction.

As shown in FIG. 2 to FIG. 4, FIG. 12 and FIG. 13, the MR element includes the first read shield portion 3 and the second read shield portion 8, and includes the MR stack 5, two insulating films 4A, an insulating film 4B, the two flux guide layers 90, the bias magnetic field applying layer 6, a protection layer 61 and the insulating refill layer 7 that are disposed between the read shield portions 3 and 8. The MR stack 5 and the second read shield portion 8 are stacked in this order on the first read shield portion 3. The first read shield portion 3 corresponds to the first shield portion of the present invention. The second read shield portion 8 corresponds to the second shield portion of the present invention.

As shown in FIG. 1, the MR stack 5 has the top surface 5a touching the second read shield portion 8, the bottom surface 5b touching the first read shield portion 3, the front end face 5c located in the medium facing surface 40 and receiving a magnetic field to be detected, the rear end face 5d opposite to the front end face 5c, and the two side surfaces 5e and 5f opposed to each other in the track width direction TW. Each of the front end face 5c, the rear end face 5d and the two side surfaces 5e and 5f is located at an end in a direction intersecting the direction in which a plurality of layers (including a first ferromagnetic layer, a spacer layer and a second ferromagnetic layer described later) constituting the MR stack 5 are stacked.

As shown in FIG. 1 and FIG. 3, each of the two flux guide layers 90 has a front end face 90c located in the medium facing surface 40 and facing toward the same direction as the front end face 5c of the MR stack 5, and a rear end face 90d opposite to the front end face 90c. The flux guide layers 90 are formed of a magnetic material, e.g., a magnetic metal material such as NiFe.

As shown in FIG. 4, the two insulating films 4A cover the two side surfaces 5e and 5f of the MR stack 5 and also lie between the top surface of the first read shield portion 3 and the two flux guide layers 90. The two flux guide layers 90 are disposed adjacent to the two side surfaces 5e and 5f of the MR stack 5, respectively, with the two insulating films 4A located between the MR stack 5 and the two flux guide layers 90, respectively. The insulating films 4A are formed of an insulating material such as alumina.

As shown in FIG. 2 and FIG. 3, the insulating film 4B covers the rear end face 5d of the MR stack 5 and the rear end faces 90d of the two flux guide layers 90, and also lies between the top surface of the first read shield portion 3 and the bias magnetic field applying layer 6. The bias magnetic field applying layer 6 is disposed adjacent to the rear end face 5d of the MR stack 5 and the rear end faces 90d of the two flux guide layers 90, with the insulating film 4B located between the layer 6 and each of the MR stack 5 and the layers 90. The bias magnetic field applying layer 6 has a front end face 6a that faces the rear end face 5d of the MR stack 5 and the rear end faces 90d of the two flux guide layers 90, with the insulating film 4B located between the front end face 6a and the rear end faces 5d, 90d. The insulating film 4B is formed of an insulating material such as alumina. The bias magnetic field applying layer 6 is formed mainly of a hard magnetic material (permanent magnet material) such as CoPt or CoCrPt. The protection layer 61 is disposed between the bias magnetic field applying layer 6 and the second read shield portion 8. The protection layer 61 is formed of a nonmagnetic conductive material such as NiCr. The insulating refill layer 7 is disposed around the flux guide layers 90 and the bias magnetic field applying layer 6. The insulating refill layer 7 is formed of an insulating material such as alumina.

A description will now be made on the configurations of the first read shield portion 3 and the second read shield portion 8 with reference to FIG. 7. As shown in FIG. 7, the first read shield portion 3 includes: a first shield bias magnetic field applying layer 71 that generates a first shield bias magnetic field; a first closed-magnetic-path-forming portion 72 that forms a first closed magnetic path P1 in conjunction with the first shield bias magnetic field applying layer 71; and a nonmagnetic layer 79. The first shield bias magnetic field applying layer 71 is disposed away from the medium facing surface 40 and has a magnetization directed to a direction B1 perpendicular to the medium facing surface 40. The nonmagnetic layer 79 is disposed on the first shield bias magnetic field applying layer 71.

The first closed-magnetic-path-forming portion 72 couples one end of the first shield bias magnetic field applying layer 71 closer to the medium facing surface 40 to the other end of the first shield bias magnetic field applying layer 71 farther from the medium facing surface 40. The structure formed by the combination of the first shield bias magnetic field applying layer 71 and the first closed-magnetic-path-forming portion 72 is loop-shaped. The first closed-magnetic-path-forming portion 72 includes a first single magnetic domain portion 70 that is brought into a single magnetic domain state such that the magnetization thereof is directed to a first direction D1 by a magnetic flux generated by the first shield bias magnetic field and passing through the first closed magnetic path P1. The first single magnetic domain portion 70 has a surface exposed at the medium facing surface 40, and extends in the track width direction TW.

The first shield bias magnetic field applying layer 71 may be formed of a hard magnetic material (permanent magnet material) such as CoPt or CoCrPt, or may be composed of a stack of a ferromagnetic layer and an antiferromagnetic layer. The first closed-magnetic-path-forming portion 72 is formed of a soft magnetic material such as NiFe, CoFe, CoFeB, CoFeNi or FeN. The first closed-magnetic-path-forming portion 72 functions as a shield to absorb an unwanted magnetic flux. The nonmagnetic layer 79 is formed of a nonmagnetic material. The nonmagnetic material to form the nonmagnetic layer 79 may be either insulating or conductive.

The first shield bias magnetic field applying layer 71 and the first closed-magnetic-path-forming portion 72 are disposed on the insulating layer 2 shown in FIG. 12 and FIG. 13. The thickness tb of the first shield bias magnetic field applying layer 71 is smaller than the thickness ts of the first closed-magnetic-path-forming portion 72. For each component of the first read shield portion 3 and the second read shield portion 8, the "thickness" refers to the dimension of the component taken in the direction perpendicular to the top surface of the substrate 1. There is a difference in level between the top surface of the first shield bias magnetic field applying layer 71 and the top surface of the first closed-magnetic-path-forming portion 72 such that the top surface of the first shield bias magnetic field applying layer 71 is located at a lower level. The nonmagnetic layer 79 is provided to fill the gap resulting from this difference in level, so that the top surface of the nonmagnetic layer 79 is located at the same level as the top surface of the first closed-magnetic-path-forming portion 72. Although not shown in FIG. 7, the nonmagnetic layer 79 is also present in the space surrounded by the first shield bias magnetic field applying layer 71 and the first closed-magnetic-path-forming portion 72. Consequently, the entire top surface of the first read shield portion 3 is flat.

In the first read shield portion 3, the first shield bias magnetic field generated by the first shield bias magnetic field applying layer 71 generates a magnetic flux passing through the first closed magnetic path P1. This magnetic flux passes through the first single magnetic domain portion 70 that extends in the track width direction TW. This magnetic flux brings the first single magnetic domain portion 70 into a single magnetic domain state such that the magnetization thereof is directed to the first direction D1.

The second read shield portion 8 has components similar to those of the first read shield portion 3. Relative positions of the components of the first read shield portion 3 and the components of the second read shield portion 8 are symmetrical with each other with respect to a line that passes through the vertical and horizontal center of the MR stack 5 and that is perpendicular to the medium facing surface 40.

The second read shield portion 8 includes: a second shield bias magnetic field applying layer 81 that generates a second shield bias magnetic field; a second closed-magnetic-path-forming portion 82 that forms a second closed magnetic path P2 in conjunction with the second shield bias magnetic field applying layer 81; and a nonmagnetic layer 89. The second shield bias magnetic field applying layer 81 is disposed away from the medium facing surface 40 and has a magnetization directed to a direction B2 perpendicular to the medium facing surface 40. The direction B2 is the same direction as the direction B1 of the magnetization of the first shield bias magnetic field applying layer 71. The nonmagnetic layer 89 is disposed below the second shield bias magnetic field applying layer 81.

The second closed-magnetic-path-forming portion 82 couples one end of the second shield bias magnetic field applying layer 81 closer to the medium facing surface 40 to the other end of the second shield bias magnetic field applying layer 81 farther from the medium facing surface 40. The structure formed by the combination of the second shield bias magnetic field applying layer 81 and the second closed-magnetic-path-forming portion 82 is loop-shaped. The second closed-magnetic-path-forming portion 82 includes a second single magnetic domain portion 80 that is brought into a single magnetic domain state such that the magnetization thereof is directed to a second direction D2 by a magnetic flux generated by the second shield bias magnetic field and passing through the second closed magnetic path P2. The second single magnetic domain portion 80 has a surface exposed at the medium facing surface 40, and extends in the track width direction TW.

Materials used for the second shield bias magnetic field applying layer 81, the second closed-magnetic-path-forming portion 82 and the nonmagnetic layer 89 are the same as those used for the first shield bias magnetic field applying layer 71, the first closed-magnetic-path-forming portion 72 and the nonmagnetic layer 79, respectively. The thickness of the second shield bias magnetic field applying layer 81 is equal to the thickness tb of the first shield bias magnetic field applying layer 71. The thickness of the second closed-magnetic-path-forming portion 82 is equal to the thickness ts of the first closed-magnetic-path-forming portion 72. Although not shown in FIG. 7, the nonmagnetic layer 89 is also present in the space surrounded by the second shield bias magnetic field applying layer 81 and the second closed-magnetic-path-forming portion 82. Consequently, the entire top surface of the second read shield portion 8 is flat.

In the second read shield portion 8, the second shield bias magnetic field generated by the second shield bias magnetic field applying layer 81 generates a magnetic flux passing through the second closed magnetic path P2. This magnetic flux passes through the second single magnetic domain portion 80 that extends in the track width direction TW. This magnetic flux brings the second single magnetic domain portion 80 into a single magnetic domain state such that the magnetization thereof is directed to the second direction D2. The first direction D1 and the second direction D2 are each parallel to the track width direction TW and are antiparallel to each other.

As shown in FIG. 4, the first single magnetic domain portion 70, the second single magnetic domain portion 80 and the MR stack 5 are disposed such that the MR stack 5 is sandwiched between the first and second single magnetic domain portions 70 and 80.

As shown in FIG. 5, the MR stack 5 includes a first ferromagnetic layer 52, a second ferromagnetic layer 54, and a spacer layer 53 made of a nonmagnetic material and disposed between the ferromagnetic layers 52 and 54. The MR stack 5 further includes a first coupling layer 51 disposed between the first single magnetic domain portion 70 and the first ferromagnetic layer 52, and a second coupling layer 55 disposed between the second ferromagnetic layer 54 and the second single magnetic domain portion 80.

The first ferromagnetic layer 52 is magnetically coupled to the first single magnetic domain portion 70. The second ferromagnetic layer 54 is magnetically coupled to the second single magnetic domain portion 80. The first ferromagnetic layer 52 and the second ferromagnetic layer 54 have magnetizations that are in directions antiparallel to each other when any external magnetic field other than a magnetic field resulting from the single magnetic domain portions 70 and 80 is not applied to the first and second ferromagnetic layers 52 and 54, and that change their directions in response to an external magnetic field other than the magnetic field resulting from the single magnetic domain portions 70 and 80. Thus, each of the ferromagnetic layers 52 and 54 functions as a free layer. Each of the ferromagnetic layers 52 and 54 is formed of a ferromagnetic material having a low coercivity, such as NiFe, CoFe, CoFeB, CoFeNi, or FeN. It should be noted that the state in which any external magnetic field other than a magnetic field resulting from the single magnetic domain portions 70 and 80 is not applied to the ferromagnetic layers 52 and 54 is a state in which any bias magnetic field generated by the bias magnetic field applying layer 6 is not applied to the ferromagnetic layers 52 and 54 when there is no magnetic field applied to the MR element from outside the MR element.

In the case where the MR stack 5 is a TMR element, the spacer layer 53 is a tunnel barrier layer. The spacer layer 53 in this case is formed of an insulating material such as alumina, $SiO_2$ or MgO. In the case where the MR stack 5 is a GMR element of the CPP structure, the spacer layer 53 is a nonmagnetic conductive layer. The spacer layer 53 in this case is formed of, for example, a nonmagnetic conductive material such as Ru, Rh, Ir, Re, Cr, Zr or Cu, or an oxide semiconductor material such as ZnO, $In_2O_3$ or $SnO_2$.

The first coupling layer 51 is a layer for magnetically coupling the first ferromagnetic layer 52 to the first single magnetic domain portion 70. The first coupling layer 51 also serves to adjust the distance between the first single magnetic domain portion 70 and the first ferromagnetic layer 52. The first coupling layer 51 includes a nonmagnetic conductive layer 51a, a magnetic layer 51b, and a nonmagnetic conductive layer 51c that are stacked in this order on the first single magnetic domain portion 70. The nonmagnetic conductive layer 51c touches the bottom surface of the first ferromagnetic layer 52. The nonmagnetic conductive layers 51a and 51c are each formed of a nonmagnetic conductive material containing at least one of Ru, Rh, Ir, Cr, Cu, Ag, Au, Pt and Pd, for example. The magnetic layer 51b is formed of a magnetic material such as NiFe, CoFe, CoFeB, CoFeNi or FeN.

The first single magnetic domain portion 70 and the magnetic layer 51b are antiferromagnetically coupled to each other by the RKKY interaction through the nonmagnetic conductive layer 51a. The magnetizations of the first single magnetic domain portion 70 and the magnetic layer 51b are therefore directed antiparallel to each other. The magnetic layer 51b and the first ferromagnetic layer 52 are antiferromagnetically coupled to each other by the RKKY interaction through the nonmagnetic conductive layer 51c. The magnetizations of the magnetic layer 51b and the first ferromagnetic layer 52 are therefore directed antiparallel to each other. As a result, the magnetization of the first ferromagnetic layer 52 is directed to the same direction as the magnetization of the first single magnetic domain portion 70. In this way, the direction of the magnetization of the first ferromagnetic layer 52 is controlled by the first single magnetic domain portion 70.

The second coupling layer 55 is a layer for magnetically coupling the second ferromagnetic layer 54 to the second single magnetic domain portion 80. The second coupling layer 55 also serves to adjust the distance between the second single magnetic domain portion 80 and the second ferromagnetic layer 54. The second coupling layer 55 includes a nonmagnetic conductive layer 55a, a magnetic layer 55b, and a nonmagnetic conductive layer 55c that are stacked in this order on the second ferromagnetic layer 54. The top surface of the nonmagnetic conductive layer 55c touches the bottom surface of the second single magnetic domain portion 80. The nonmagnetic conductive layers 55a and 55c are each formed of a nonmagnetic conductive material containing at least one of Ru, Rh, Ir, Cr, Cu, Ag, Au, Pt and Pd, for example. The magnetic layer 55b is formed of a magnetic material such as NiFe, CoFe, CoFeB, CoFeNi or FeN.

In the example shown in FIG. 5, the structure of the second coupling layer 55 is vertically symmetrical with the structure of the first coupling layer 51. In this example, each of the coupling layers 51 and 55 includes a magnetic layer, and two nonmagnetic conductive layers sandwiching the magnetic layer. However, the configuration of each of the first and second coupling layers 51 and 55 is not limited to the three-layer configuration shown in FIG. 5. Each of the coupling layers 51 and 55 may be composed of three or more nonmagnetic conductive layers, and magnetic layers disposed between every adjacent two of the nonmagnetic conductive layers, or may be composed of a single nonmagnetic conductive layer only. The first and second coupling layers 51 and 55 may have configurations different from each other. For example, one of the first and second coupling layers 51 and 55 may be composed of a magnetic layer and two nonmagnetic conductive layers sandwiching the magnetic layer, while the other of the first and second coupling layers 51 and 55 may be composed of a single nonmagnetic conductive layer only.

The second single magnetic domain portion 80 and the magnetic layer 55b are antiferromagnetically coupled to each other by the RKKY interaction through the nonmagnetic conductive layer 55c. The magnetizations of the second single magnetic domain portion 80 and the magnetic layer 55b are therefore directed antiparallel to each other. The magnetic layer 55b and the second ferromagnetic layer 54 are antiferromagnetically coupled to each other by the RKKY interaction through the nonmagnetic conductive layer 55a. The magnetizations of the magnetic layer 55b and the second ferromagnetic layer 54 are therefore directed antiparallel to each other. As a result, the magnetization of the second ferromagnetic layer 54 is directed to the same direction as the magnetization of the second single magnetic domain portion 80. In this way, the direction of the magnetization of the second ferromagnetic layer 54 is controlled by the second single magnetic domain portion 80.

In the present embodiment, since the directions of the magnetizations of the first single magnetic domain portion 70 and the second single magnetic domain portion 80 are antiparallel to each other, the directions of the magnetizations of the first ferromagnetic layer 52 and the second ferromagnetic layer 54 are antiparallel to each other.

As shown in FIG. 2, the bias magnetic field applying layer 6 has a magnetization directed to the direction B3 perpendicular to the medium facing surface 40. The bias magnetic field applying layer 6, the first shield bias magnetic field applying layer 71 and the second shield bias magnetic field applying layer 81 preferably have magnetizations directed to the same direction. The bias magnetic field applying layer 6 applies a bias magnetic field to the ferromagnetic layers 52 and 54 so that the magnetizations of the ferromagnetic layers 52 and 54 change their directions compared with a state in which no bias magnetic field is applied to the ferromagnetic layers 52 and 54. The bias magnetic field applying layer 6 preferably applies a bias magnetic field to the ferromagnetic layers 52 and 54 so that the magnetizations of the ferromagnetic layers 52 and 54 are directed orthogonal to each other.

The MR element of the present embodiment is of the CPP structure. More specifically, a sense current, which is a current used for detecting a signal magnetic field, is fed in a direction intersecting the planes of the layers constituting the MR stack 5, such as the direction perpendicular to the planes of the layers constituting the MR stack 5. The first read shield portion 3 and the second read shield portion 8 also function as a pair of electrodes for feeding the sense current to the MR stack 5 in a direction intersecting the planes of the layers constituting the MR stack 5, such as the direction perpendicular to the planes of the layers constituting the MR stack 5.

A manufacturing method for the MR element of the present embodiment will now be described. In this manufacturing method, first, the first closed-magnetic-path-forming portion 72 is formed on the insulating layer 2 by, for example, frame plating. Next, the first shield bias magnetic field applying layer 71 is formed by, for example, lift-off. Next, the nonmagnetic layer 79 is formed to cover the first shield bias magnetic field applying layer 71 and the first closed-magnetic-path-forming portion 72 by, for example, sputtering. Next, the nonmagnetic layer 79 is polished by, for example, chemical mechanical polishing (hereinafter referred to as CMP), until the first closed-magnetic-path-forming portion 72 becomes exposed, and the top surfaces of the first closed-magnetic-path-forming portion 72 and the nonmagnetic layer 79 are thereby flattened.

Figure 8:
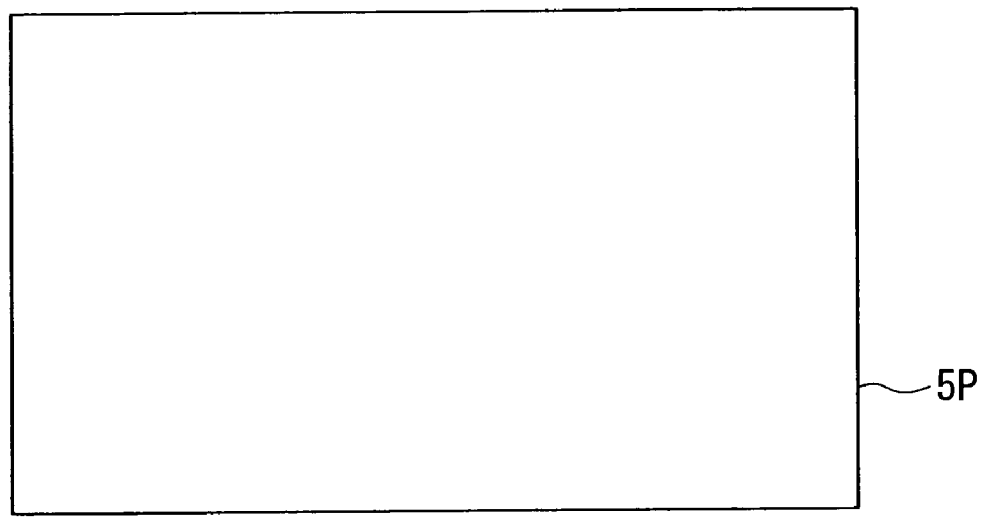
FIG. 8 is a plan view illustrating a step of a method of manufacturing the magnetoresistive element of the first embodiment of the invention.
Figure 9:
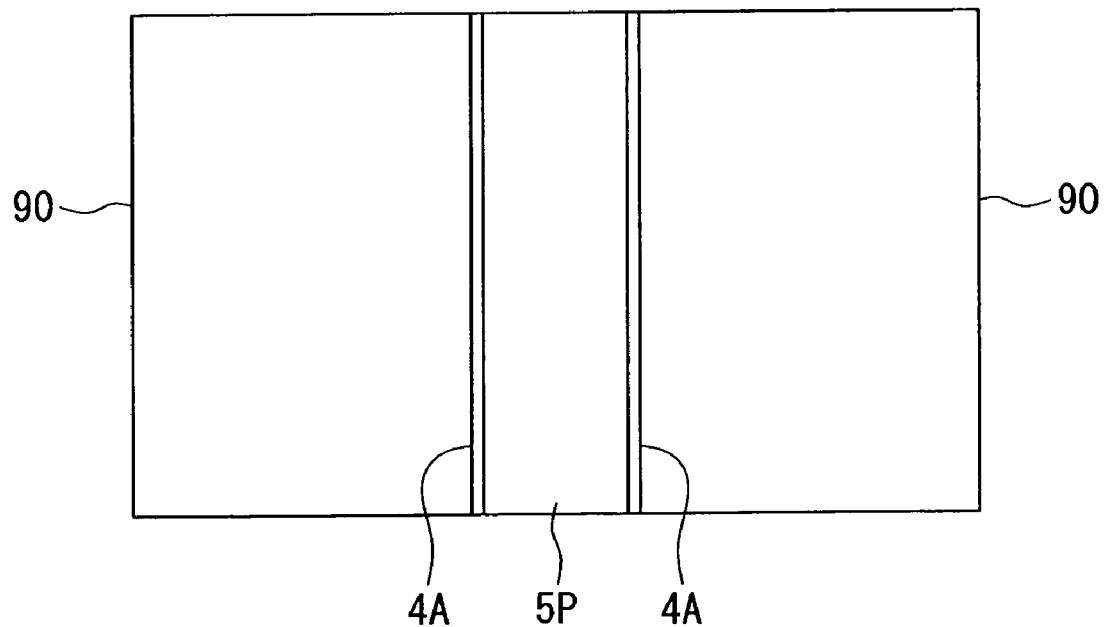
FIG. 9 is a plan view illustrating a step that follows the step of FIG. 8.
Figure 10:
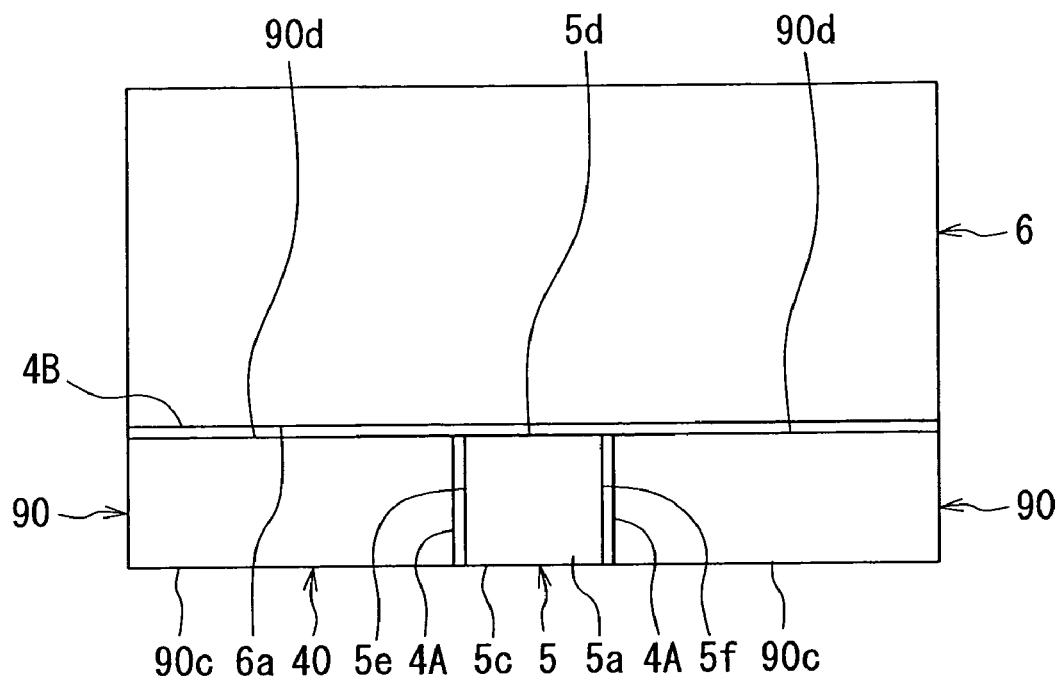
FIG. 10 is a plan view illustrating a step that follows the step of FIG. 9.

Next, in a series of steps shown in FIG. 8 to FIG. 10, the MR stack 5, the insulating films 4A and 4B, the two flux guide layer 90 and the bias magnetic field applying layer 6 are formed on the first single magnetic domain portion 70 included in the first closed-magnetic-path-forming portion 72. In the series of steps, first, films to later become the layers constituting MR stack 5 are formed in succession on the first single magnetic domain portion 70 by, for example, sputtering. A layered film 5P for the MR stack 5 is thereby formed. FIG. 8 is a plan view of the layered film 5P.

FIG. 9 is a plan view illustrating a step that follows the step of FIG. 8. In this step, first, the layered film 5P is selectively etched to form two side surfaces that will later become the two side surfaces 5e and 5f of the MR stack 5. Next, the two insulating films 4A are formed by, for example, sputtering, to cover the two side surfaces of the layered film 5P and to also cover portions of the top surface of the first single magnetic domain portion 70 on which the layered film 5P is not present. Next, the two flux guide layers 90 are formed on the two insulating films 4A by, for example, lift-off.

FIG. 10 is a plan view illustrating a step that follows the step of FIG. 9. In this step, first, the layered film 5P, the two flux guide layers 90 and the insulating films 4A are selectively etched so that the rear end face 5d of the MR stack 5 and the rear end faces 90d of the two flux guide layers 90 are formed. The layered film 5P thereby becomes the MR stack 5. Next, the insulating film 4B is formed by, for example, sputtering, to cover the rear end face 5d of the MR stack 5 and the rear end faces 90d of the two flux guide layers 90, and to also cover a portion of the top surface of the first single magnetic domain portion 70 on which the layered film 5P, the two flux guide layers 90 and the insulating films 4A are not present. Next, the bias magnetic field applying layer 6 and the protection layer 61 are formed in succession on the insulating film 4B by, for example, lift-off. Next, the insulating refill layer 7 is formed by, for example, lift-off.

Next, the second closed-magnetic-path-forming portion 82 is formed on the MR stack 5, the two flux guide layers 90, the protection layer 61 and the insulating refill layer 7 by, for example, frame plating. Next, a portion of the nonmagnetic layer 89 to be located below the second shield bias magnetic field applying layer 81 and the second shield bias magnetic field applying layer 81 are formed by, for example, lift-off.

Next, the remainder of the nonmagnetic layer 89 is formed to cover the second closed-magnetic-path-forming portion 82 and the second shield bias magnetic field applying layer 81 by, for example, sputtering. Next, the nonmagnetic layer 89 is polished by, for example, CMP, until the second closed-magnetic-path-forming portion 82 and the second shield bias magnetic field applying layer 81 become exposed, and the top surfaces of the second closed-magnetic-path-forming portion 82 and the nonmagnetic layer 89 are thereby flattened.

The first and second shield bias magnetic field applying layers 71 and 81 and the bias magnetic field applying layer 6 are subjected to magnetizing so that they have magnetizations in, for example, the same direction.

Figure 11:
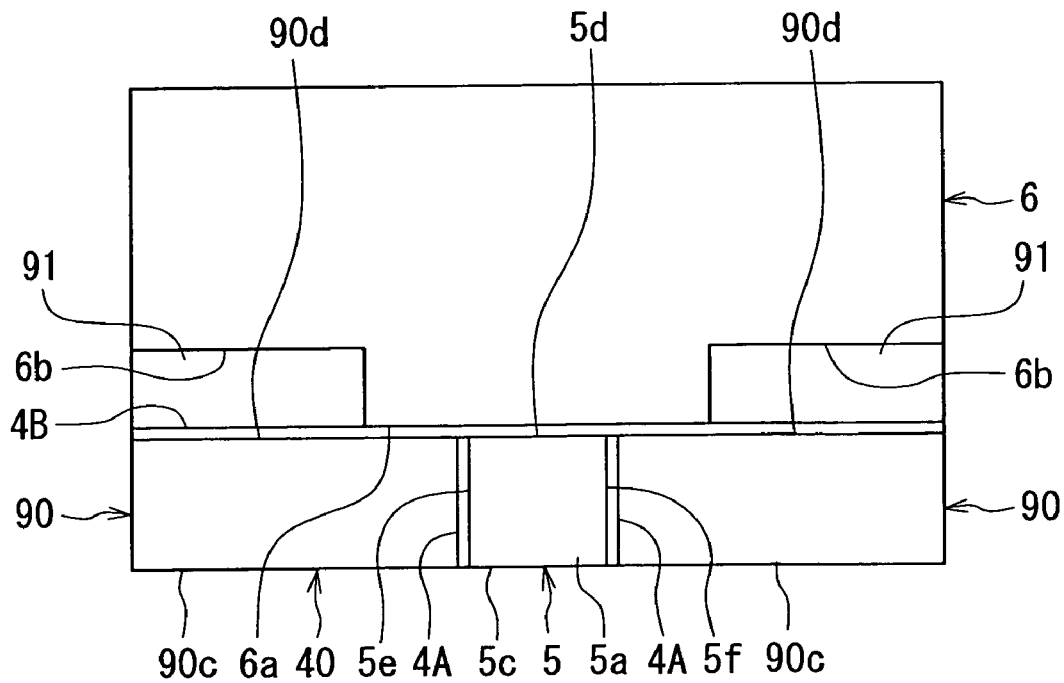
FIG. 11 is a plan view of a modification example of the magnetoresistive element of the first embodiment of the invention.

FIG. 11 shows a modification example of the MR element of the first embodiment. In this modification example, the bias magnetic field applying layer 6 has a shape different from the shape shown in FIG. 1. Specifically, in the modification example the bias magnetic field applying layer 6 has a front end face 6a, and two end faces 6b located on opposite sides of the front end face 6a in the track width direction and respectively facing toward the two rear end faces 90d of the two flux guide layers 90. The two end faces 6b are located farther from the medium facing surface 40 than is the front end face 6a. Consequently, two gaps are formed between the respective end faces 6b and respective portions of the insulating film 4B covering the two rear end faces 90d. Two nonmagnetic layers 91 made of a nonmagnetic material are provided in these two gaps. The nonmagnetic material to be used for the nonmagnetic layers 91 may be either insulating or conductive. In this modification example, the front end face 6a of the bias magnetic field applying layer 6 faces the rear end face 5d of the MR stack 5 and the rear end faces 90d of the two flux guide layers 90, with the insulating film 4B located between the front end face 6a and the rear end faces 5d, 90d.

Figure 14:
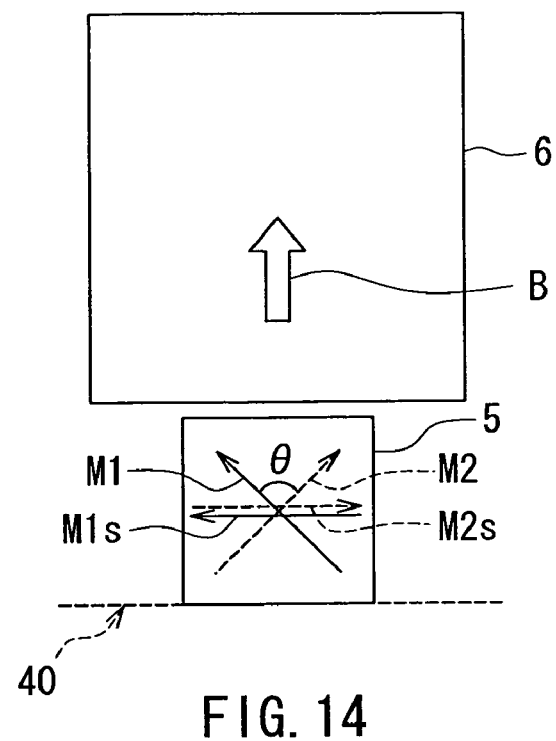
FIG. 14 is an illustrative view for explaining the operation of the magnetoresistive element of the first embodiment of the invention.
Figure 15:
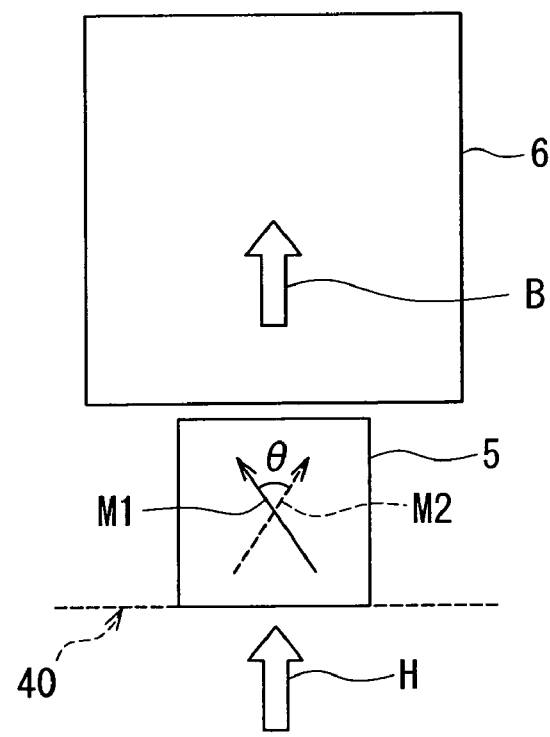
FIG. 15 is an illustrative view for explaining the operation of the magnetoresistive element of the first embodiment of the invention.
Figure 16:
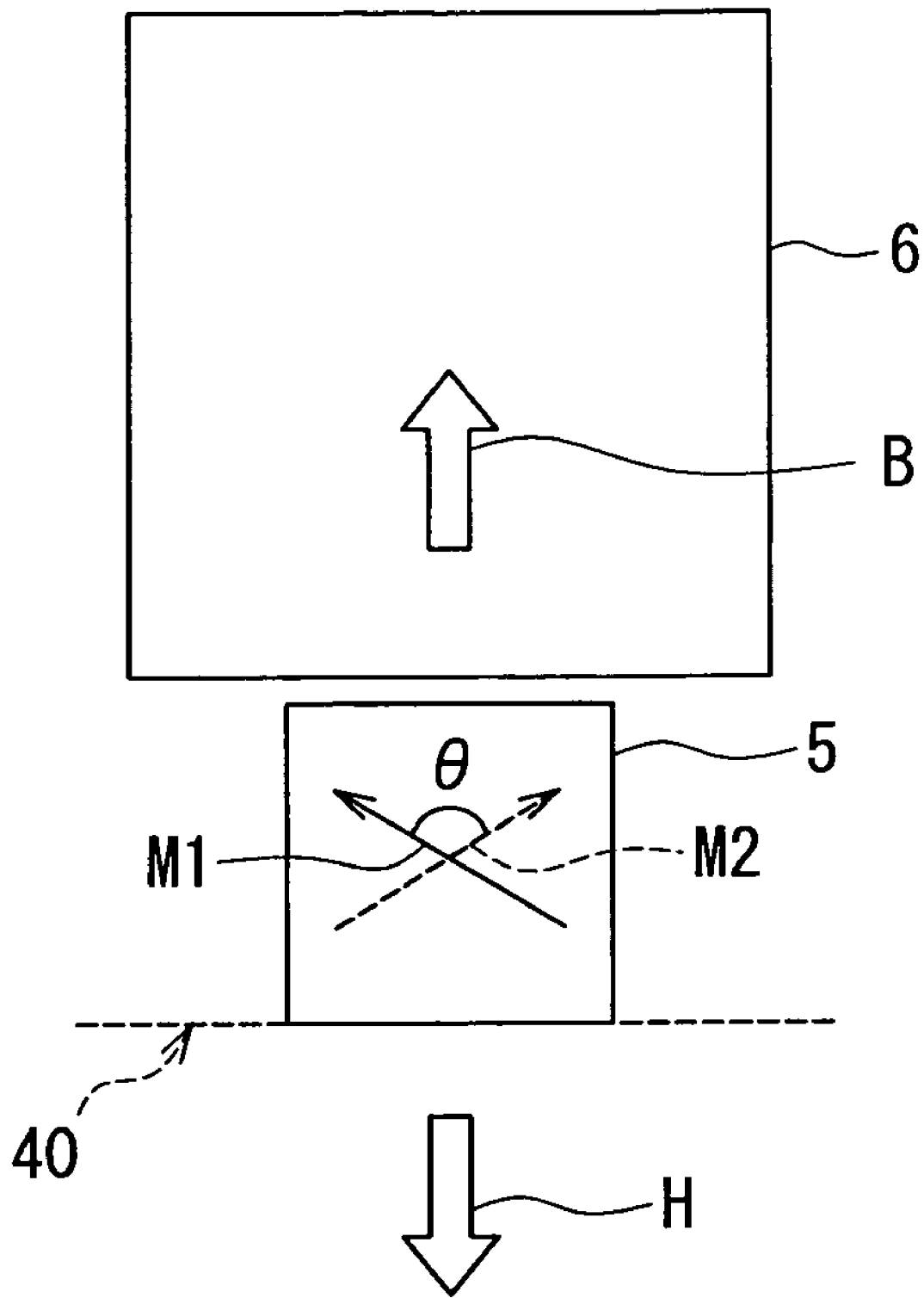
FIG. 16 is an illustrative view for explaining the operation of the magnetoresistive element of the first embodiment of the invention.

The operation of the MR element of the present embodiment will now be described with reference to FIG. 14 to FIG. 16. Each of FIG. 14 to FIG. 16 shows the MR stack 5 and the bias magnetic field applying layer 6. In FIG. 14 to FIG. 16 the arrow marked with "B" indicates a bias magnetic field generated by the bias magnetic field applying layer 6. The arrow marked with "M1s" indicates the direction of the magnetization of the first ferromagnetic layer 52 when any external magnetic field (including a bias magnetic field) other than a magnetic field resulting from the first and second single magnetic domain portions 70 and 80 is not applied to the first ferromagnetic layer 52. The arrow marked with "M2s" indicates the direction of the magnetization of the second ferromagnetic layer 54 when any external magnetic field described above is not applied to the second ferromagnetic layer 54. The arrow marked with "M1" indicates the direction of the magnetization of the first ferromagnetic layer 52 when the bias magnetic field B is applied to the first ferromagnetic layer 52. The arrow marked with "M2" indicates the direction of the magnetization of the second ferromagnetic layer 54 when the bias magnetic field B is applied to the second ferromagnetic layer 54.

As shown in FIG. 14, when no external magnetic field is applied to the ferromagnetic layers 52 and 54, the directions of the magnetizations of the ferromagnetic layers 52 and 54 are antiparallel to each other. When the bias magnetic field B is applied but no signal magnetic field is applied to the ferromagnetic layers 52 and 54, the directions of the magnetizations of the ferromagnetic layers 52 and 54 become nonantiparallel to each other. When in this state, it is desirable that the direction of the magnetization of the first ferromagnetic layer 52 and the direction of the magnetization of the second ferromagnetic layer 54 each form an angle of 45 degrees with respect to the medium facing surface 40 and the relative angle θ between the directions of the magnetizations of the ferromagnetic layers 52 and 54 be 90 degrees.

FIG. 15 shows a state in which the bias magnetic field B and also a signal magnetic field H in the same direction as the bias magnetic field B are applied to the ferromagnetic layers 52 and 54. When in this state, the angle formed by the direction of the magnetization of the first ferromagnetic layer 52 with respect to the medium facing surface 40 and the angle formed by the direction of the magnetization of the second ferromagnetic layer 54 with respect to the medium facing surface 40 are each greater compared with the state shown in FIG. 14. As a result, the relative angle θ between the directions of the magnetizations of the ferromagnetic layers 52 and 54 is smaller compared with the state shown in FIG. 14.

FIG. 16 shows a state in which the bias magnetic field B and also a signal magnetic field H in a direction opposite to the direction of the bias magnetic field B are applied to the ferromagnetic layers 52 and 54. When in this state, the angle formed by the direction of the magnetization of the first ferromagnetic layer 52 with respect to the medium facing surface 40 and the angle formed by the direction of the magnetization of the second ferromagnetic layer 54 with respect to the medium facing surface 40 are each smaller compared with the state shown in FIG. 14. As a result, the relative angle θ between the directions of the magnetizations of the ferromagnetic layers 52 and 54 is greater compared with the state shown in FIG. 14.

The relative angle between the directions of the magnetizations of the ferromagnetic layers 52 and 54 thus changes in response to a signal magnetic field, and as a result, the resistance of the MR stack 5 changes. It is therefore possible to detect the signal magnetic field by detecting the resistance of the MR stack 5. The resistance of the MR stack 5 can be determined from the potential difference produced in the MR stack 5 when a sense current is fed to the MR stack 5. It is thus possible, through the use of the MR element, to read data stored on the recording medium.

Advantageous effects of the MR element of the present embodiment will now be described. In the present embodiment, the magnetizations of the first single magnetic domain portion 70 and the second single magnetic domain portion 80 are directed antiparallel to each other. The first ferromagnetic layer 52 is magnetically coupled to the first single magnetic domain portion 70, and the second ferromagnetic layer 54 is magnetically coupled to the second single magnetic domain portion 80. As a result, the first and second ferromagnetic layers 52 and 54 have magnetizations that are directed antiparallel to each other when any external magnetic field other than a magnetic field resulting from the single magnetic domain portions 70 and 80 is not applied to the first and second ferromagnetic layers 52 and 54. According to the present embodiment, it is thus possible to direct the magnetizations of the two ferromagnetic layers 52 and 54 antiparallel to each other when no external magnetic field is applied, without making use of antiferromagnetic coupling between the two ferromagnetic layers through the spacer layer 53. Consequently, according to the present embodiment, no limitation is imposed on the material and thickness of the spacer layer 53, in contrast to the case of making use of antiferromagnetic coupling between the two ferromagnetic layers.

Furthermore, according to the present embodiment, as shown in FIG. 1, the two flux guide layers 90 each formed of a magnetic material are provided adjacent to the two side surfaces 5e and 5f of the MR stack 5, respectively, with the two insulating films 4A located between the MR stack 5 and the two flux guide layers 90, respectively. In addition, the bias magnetic field applying layer 6 has the front end face 6a that faces the rear end face 5d of the MR stack 5 and the respective rear end faces 90d of the two flux guide layers 90. The two flux guide layers 90 have the function of absorbing part of the magnetic flux coming from the bias magnetic field applying layer 6 and thereby decreasing the magnetic flux entering the single magnetic domain portions 70 and 80 from the bias magnetic field applying layer 6. The present embodiment thus allows a reduction in magnetic flux entering the single magnetic domain portions 70 and 80 from the bias magnetic field applying layer 6, and thereby allows the single magnetic domain portions 70 and 80 to be magnetically stable. As a result, according to the present embodiment, it is possible to suppress the occurrence of an abrupt change in output of the MR element. This will now be described in detail with reference to comparisons between the MR element of the present embodiment and an MR element of Comparative Example.

Figure 17:
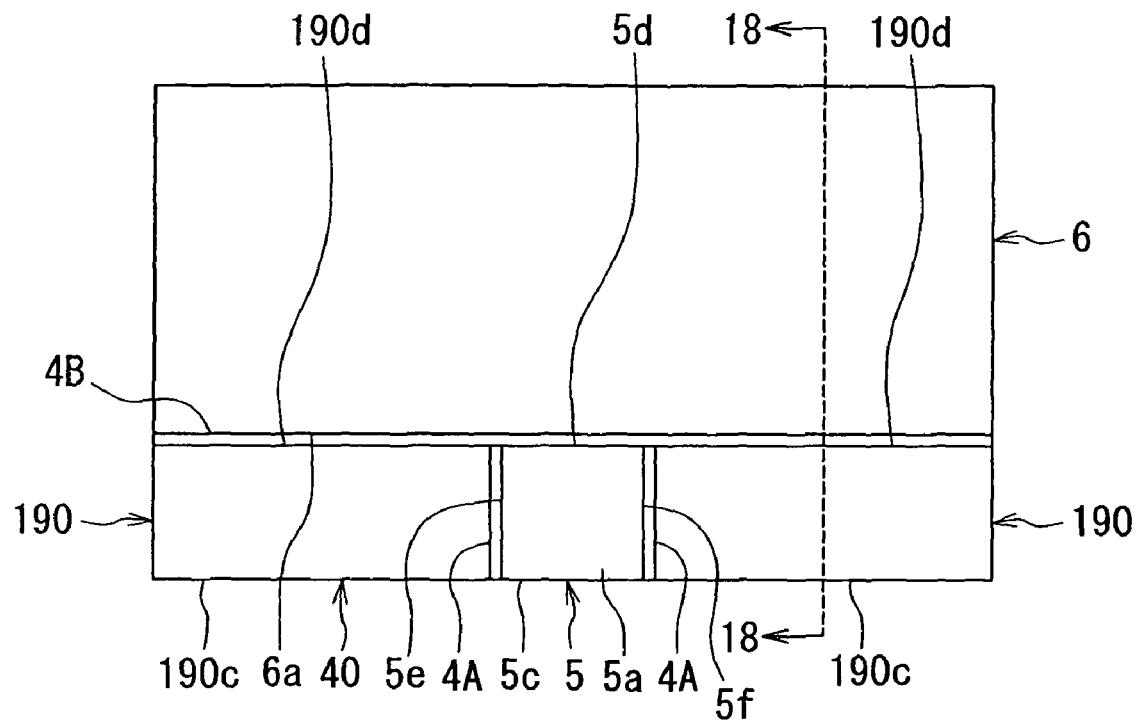
FIG. 17 is a plan view of a main part of a magnetoresistive element of Comparative Example.
Figure 18:
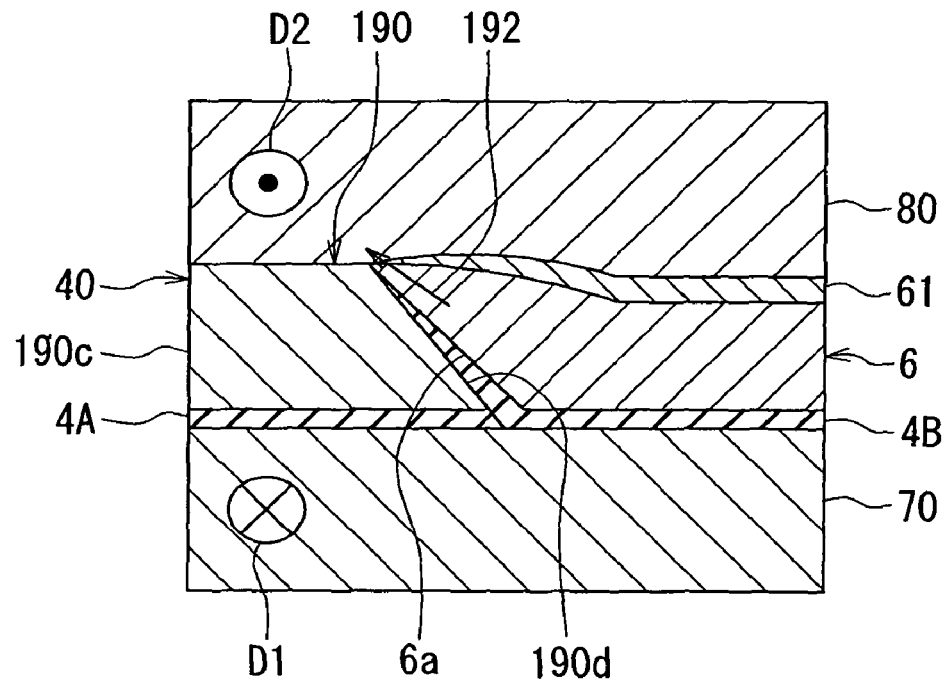
FIG. 18 is a cross-sectional view showing a cross section of the magnetoresistive element of Comparative Example taken along line 18-18 of FIG. 17.

FIG. 17 is a plan view of a main part of the MR element of Comparative Example. FIG. 18 is a cross-sectional view showing a cross section of the MR element of Comparative Example taken along line 18-18 of FIG. 17. The MR element of Comparative Example is provided with two nonmagnetic layers 190 made of a nonmagnetic material, instead of the two flux guide layers 90 of the present embodiment. Each of the two nonmagnetic layers 190 has a front end face 190c located in the medium facing surface 40 and facing toward the same direction as the front end face 5c of the MR stack 5, and a rear end face 190d opposite to the front end face 190c. The nonmagnetic material to be used for the nonmagnetic layers 190 may be either insulating or conductive. The front end face 6a of the bias magnetic field applying layer 6 faces the rear end face 5d of the MR stack 5 and the respective rear end faces 190d of the two nonmagnetic layers 190, with the insulating film 4B located between the front end face 6a and the rear end faces 5d, 190d. The remainder of configuration of the MR element of Comparative Example is the same as that of the MR element of the present embodiment.

In the MR element of Comparative Example, in the vicinity of the areas where the front end face 6a of the bias magnetic field applying layer 6 and the rear end faces 190d of the two nonmagnetic layers 190 face each other, the magnetic flux coming from the bias magnetic field applying layer 6 more easily gets into the single magnetic domain portions 70 and 80 made of a magnetic material, than into the two nonmagnetic layers 190. Especially in the vicinity of a portion of the front end face 6a closer to the second single magnetic domain portion 80, the protection layer 61 tends to be smaller in thickness as shown in FIG. 18, and the distance between the bias magnetic field applying layer 6 and the second single magnetic domain portion 80 thereby tends to become smaller. Consequently, the magnetic flux coming from the bias magnetic field applying layer 6 tends to enter the second single magnetic domain portion 80 especially in the vicinity of the portion of the front end face 6a closer to the second single magnetic domain portion 80. In FIG. 18 the arrow 192 shows the flow of the magnetic flux. The single magnetic domain portions 70 and 80 become magnetically unstable when the magnetic flux coming from the bias magnetic field applying layer 6 enters the single magnetic domain portions 70 and 80. As a result, abrupt changes in output voltage occur with high frequency in the MR element of Comparative Example, as can be seen from the experimental results shown later.

In contrast, according to the present embodiment, the two flux guide layers 90 are disposed adjacent to the two side surfaces 5e and 5f of the MR stack 5, respectively, and the front end face 6a of the bias magnetic field applying layer 6 faces the rear end face 5d of the MR stack 5 and the respective rear end faces 90d of the two flux guide layers 90. Consequently, as shown in FIG. 3, in the vicinity of the areas where the front end face 6a of the bias magnetic field applying layer 6 and the rear end faces 90d of the two flux guide layers 90 face each other, the two flux guide layers 90 absorb part of the magnetic flux coming from the bias magnetic field applying layer 6, thereby decreasing the magnetic flux entering the single magnetic domain portions 70 and 80 from the bias magnetic field applying layer 6. In FIG. 3 the arrows 92 show the flows of the magnetic flux. Thus, the single magnetic domain portions 70 and 80 of the MR element of the present embodiment are higher in magnetic stability than those of the MR element of Comparative Example. As a result, according to the present embodiment, it is possible to suppress the occurrence of an abrupt change in output of the MR element.

For the MR element of Comparative Example, the dimension of the front end face 6a of the bias magnetic field applying layer 6 taken in the track width direction could be made as small as the dimension of the rear end face 5d of the MR stack 5 taken in the track width direction in order to prevent the magnetic flux from entering the single magnetic domain portions 70 and 80 from the bias magnetic field applying layer 6 in the vicinity of the areas where the front end face 6a of the bias magnetic field applying layer 6 and the rear end faces 190d of the two nonmagnetic layers 190 face each other. If this is done, however, it becomes impossible for the bias magnetic field applying layer 6 to apply a sufficient bias magnetic field to the ferromagnetic layers 52 and 54 of the MR stack 5.

The experimental results demonstrating the advantageous effects of the MR element of the present embodiment will now be described. In the experiment, 200 MR elements of Example and 200 MR elements of Comparative Example were prepared and their characteristics were investigated. The MR elements of Example each have the configuration of the MR element of the present embodiment. The MR elements of Comparative Example are each provided with the two nonmagnetic layers 190 instead of the two flux guide layers 90 of the present embodiment, as has been described with reference to FIG. 17 and FIG. 18.

For the MR elements of Example, each of the closed-magnetic-path-forming portions 72 and 82 was formed of NiFe and to have a saturation flux density of 1.0 T. Each of the shield bias magnetic field applying layers 71 and 81 was formed of CoPt and to have a saturation flux density of 1.2 T and a residual flux density of 1.0 T. The dimension Wb (see FIG. 7) of each of the shield bias magnetic field applying layers 71 and 81 taken in the track width direction was set to 25 μm, and the thickness tb (see FIG. 7) of each of the shield bias magnetic field applying layers 71 and 81 was set to 0.1 μm. The dimension Ws (see FIG. 7) of each of the single magnetic domain portions 70 and 80 taken in direction perpendicular to the medium facing surface 40 was set to 5 μm, and the thickness ts of each of the closed-magnetic-path-forming portions 72 and 82, which respectively include the single magnetic domain portions 70 and 80, was set to 0.5 μm. Therefore, the product of the residual flux density and the cross-sectional area of the magnetic path in each of the shield bias magnetic field applying layers 71 and 81 is equal to the product of the saturation flux density and the cross-sectional area of the magnetic path in each of the single magnetic domain portions 70 and 80. These conditions also apply to the MR elements of Comparative Example.

In the experiment, a quasi static test was performed on each of the 200 MR elements of Example and 200 MR elements of Comparative Example to investigate the characteristics of the MR elements. In the quasi static test, an alternating magnetic field of −500 Oe to 500 Oe (1 Oe=79.6 A/m) was applied to each MR element in the direction perpendicular to the medium facing surface 40 and the relationship between the applied magnetic field H and the output voltage V of the MR element was obtained. Here, the difference between the maximum value and the minimum value (peak-to-peak value) of the output voltage V when the above-mentioned alternating magnetic field was applied to the MR element is defined as the output value Amp.

Figure 19:
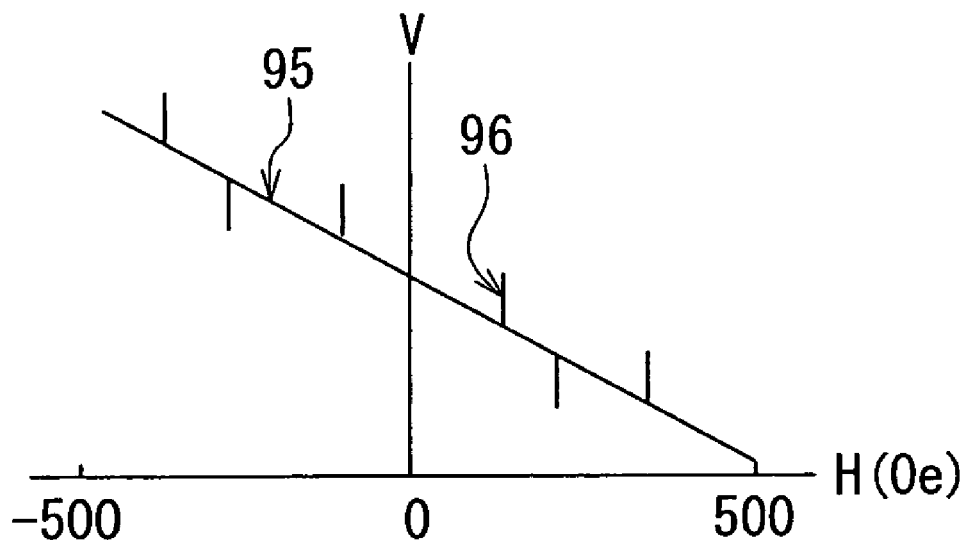
FIG. 19 is a plot showing the characteristic of the magnetoresistive element of Comparative Example.
Figure 20:
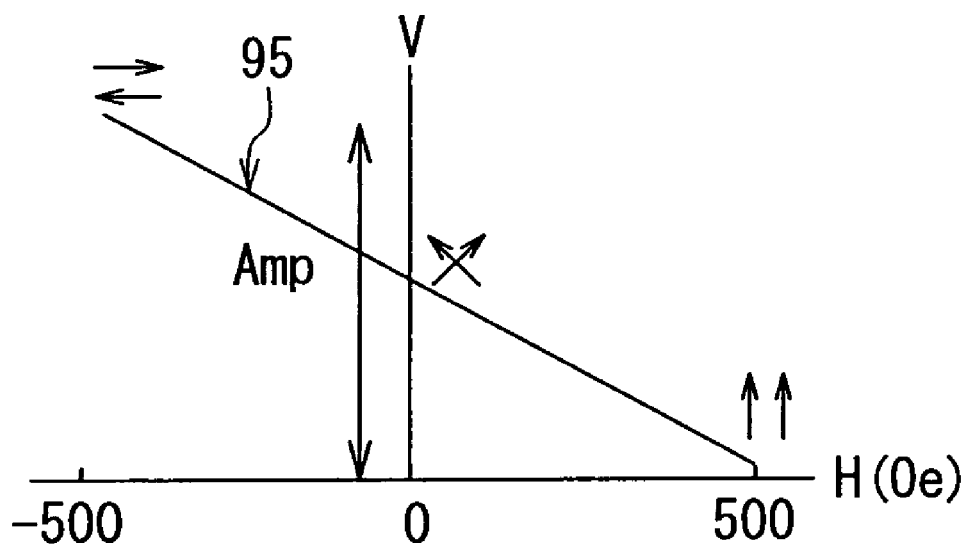
FIG. 20 is a plot showing the characteristic of the magnetoresistive element of the first embodiment of the invention.

FIG. 19 shows the relationship between the applied magnetic field H and the output voltage V for one of the MR elements of Comparative Example. FIG. 20 shows the relationship between the applied magnetic field H and the output voltage V for one of the MR elements of Example. In each of FIG. 19 and FIG. 20, the straight line 95 shows the relationship between the applied magnetic field H and the output voltage V of the MR element. In FIG. 19 the straight lines 96 indicate that the output voltage V abruptly changed to greatly deviate from its ideal value (shown by the straight line 95) when the applied magnetic field H was of certain magnitude. In FIG. 20, the three pairs of arrows drawn near the straight line 95 indicate the directions of the magnetizations of the ferromagnetic layers 52 and 54.

In the experiment, an MR element that showed an abrupt change in output voltage as indicated by each straight line 96 of FIG. 19, the magnitude of the abrupt change (the magnitude of the change in voltage indicated with the length of the straight line 96 of FIG. 19) exceeding 10% of the output value Amp, was defined as a defective element. Then, the percentage of the defective elements in the 200 MR elements of Example and that in the 200 MR elements of Comparative Example were determined. The results showed that the percentage of the defective elements in the 200 MR elements of Example was 7%, whereas the percentage of the defective elements in the 200 MR elements of Comparative Example was 47%. This indicates that the MR elements of Example are capable of significantly suppressing the occurrence of abrupt changes in output voltage, compared with the MR elements of Comparative Example. From the above experimental results, it can be seen that the present embodiment allows suppression of the occurrence of abrupt changes in output of the MR element.

According to the present embodiment, the two flux guide layers 90 formed of a magnetic material are provided adjacent to the two side surfaces 5e and 5f of the MR stack 5, respectively, with the two insulating films 4A located between the MR stack 5 and the flux guide layers 90, respectively. The two flux guide layers 90 also function as a shield to absorb an unwanted magnetic flux. Consequently, according to the present embodiment, it is possible to achieve a smaller read effective track width than in the case where the two nonmagnetic layers 190 are provided adjacent to the two side surfaces 5e and 5f of the MR stack 5 as in the Comparative Example. Measurement of the read effective track width for each of the MR elements of Example and Comparative Example showed that the read effective track width of the MR element of Example was smaller than that of the MR element of Comparative Example by about 10%.

Figure 22:
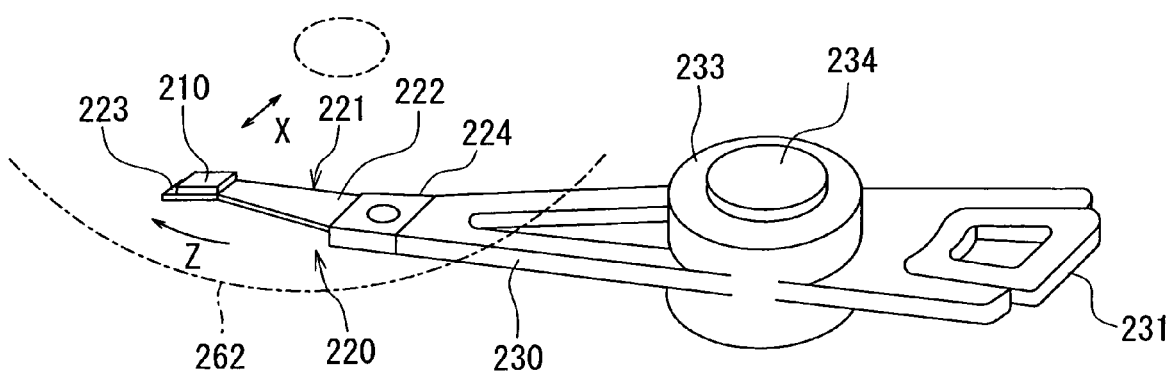
FIG. 22 is a perspective view of a head arm assembly of the first embodiment of the invention.

A head assembly and a magnetic disk drive of the present embodiment will now be described. Reference is now made to FIG. 22 to describe the head assembly of the present embodiment. The head assembly of the present embodiment includes the slider 210 shown in FIG. 21 and a supporter that flexibly supports the slider 210. Forms of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has: a plate-spring-shaped load beam 222 formed of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of a magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

FIG. 22 shows the head arm assembly of the present embodiment. In this head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 23:
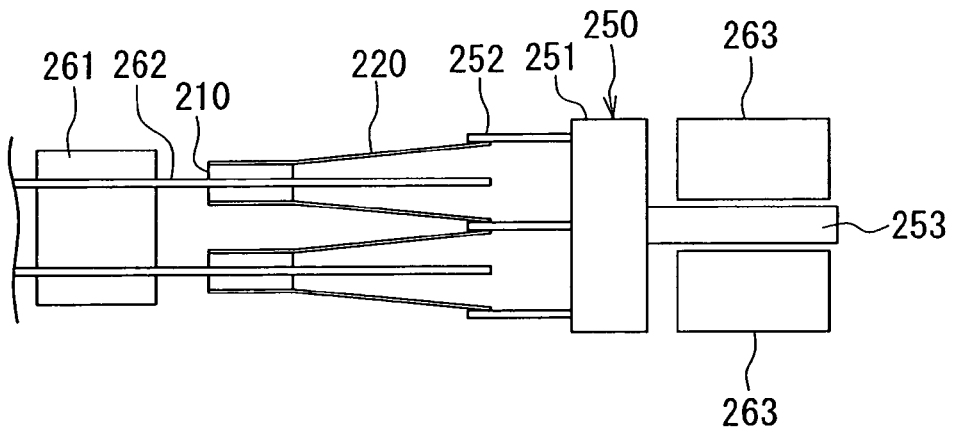
FIG. 23 is an illustrative view for illustrating a main part of a magnetic disk drive of the first embodiment of the invention.
Figure 24:
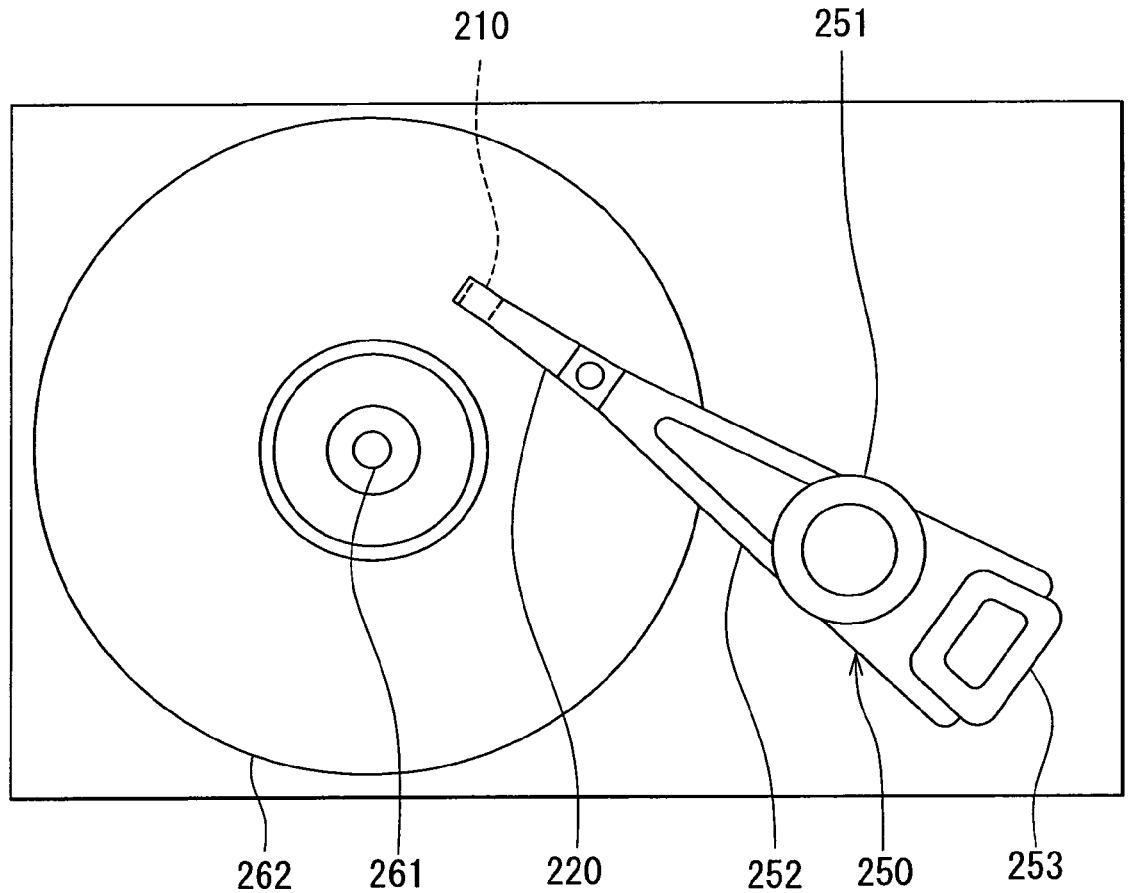
FIG. 24 is a plan view of the magnetic disk drive of the first embodiment of the invention.

Reference is now made to FIG. 23 and FIG. 24 to describe an example of the head stack assembly and the magnetic disk drive of the present embodiment. FIG. 23 is an illustrative view showing a main part of the magnetic disk drive, and FIG. 24 is a plan view of the magnetic disk drive. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 that is part of the voice coil motor is mounted on a side of the carriage 251 opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262 such that the two sliders 210 are opposed to each other with a platter 262 disposed in between. The voice coil motor includes permanent magnets 263 disposed to be opposed to each other, the coil 253 of the head stack assembly 250 being placed between the magnets 263. The actuator and the head stack assembly 250 except the sliders 210 support the sliders 210 and align them with respect to the magnetic disk platters 262.

In the magnetic disk drive of the present embodiment, the actuator moves the slider 210 across the tracks of the magnetic disk platter 262 and aligns the slider 210 with respect to the magnetic disk platter 262. The thin-film magnetic head included in the slider 210 writes data on the magnetic disk platter 262 by using the write head, and reads data stored on the magnetic disk platter 262 by using the read head.

The head assembly and the magnetic disk drive of the present embodiment provide advantageous effects similar to those of the thin-film magnetic head of the embodiment described previously.

Second Embodiment

An MR element of a second embodiment of the invention will now be described with reference to FIG. 25 and FIG. 26.

In the MR element of the second embodiment, the first and second read shield portions 3 and 8 and the MR stack 5 have configurations different from those of the first embodiment. FIG. 25 is a cross-sectional view showing a cross section of the MR element of the second embodiment parallel to the medium facing surface 40. FIG. 26 is an enlarged cross-sectional view of the MR stack 5 of FIG. 25. The X, Y and Z directions shown in FIG. 21 are also shown in FIG. 25 and FIG. 26. In FIG. 25 and FIG. 26, the Y direction is orthogonal to the X and Z directions. In FIG. 25 and FIG. 26, arrows in the layers show the directions of the magnetizations of the layers.

Figure 25:
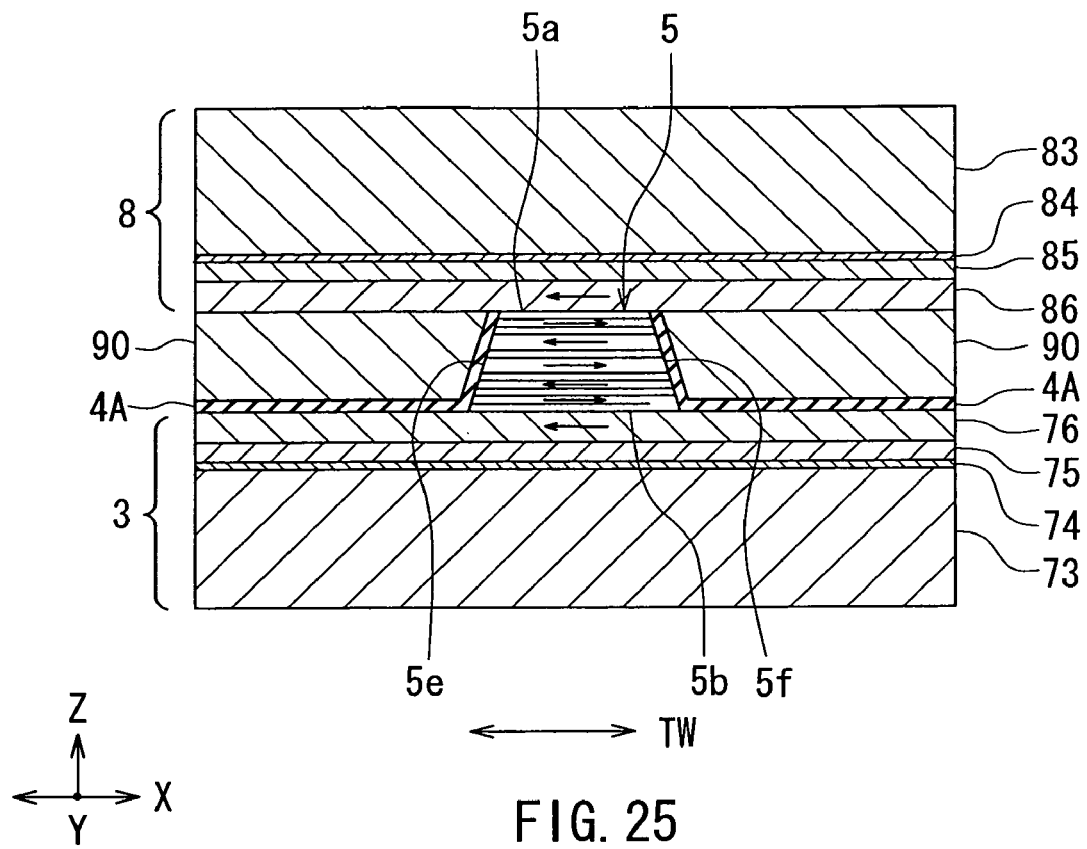
FIG. 25 is a cross-sectional view showing a cross section of a magnetoresistive element of a second embodiment of the invention parallel to the medium facing surface.

As shown in FIG. 25, the first read shield portion 3 of the second embodiment includes: a first main shield layer 73 disposed on the insulating layer 2 (see FIG. 12 and FIG. 13); an underlayer 74 disposed on the first main shield layer 73; a first antiferromagnetic layer 75 disposed on the underlayer 74; and a first single magnetic domain layer 76 disposed on the first antiferromagnetic layer 75.

The second read shield portion 8 of the second embodiment includes: a second single magnetic domain layer 86 disposed on the MR stack 5, the two flux guide layers 90, the protection layer 61, the insulating films 4A and 4B and the insulating refill layer 7; a second antiferromagnetic layer 85 disposed on the second single magnetic domain layer 86; a nonmagnetic cap layer 84 disposed on the second antiferromagnetic layer 85; and a second main shield layer 83 disposed on the nonmagnetic cap layer 84.

The first main shield layer 73, the first single magnetic domain layer 76, the second single magnetic domain layer 86 and the second main shield layer 83 are each formed of a soft magnetic material such as NiFe, CoFe, CoFeB, CoFeNi or FeN. The first main shield layer 73, the first single magnetic domain layer 76, the second single magnetic domain layer 86 and the second main shield layer 83 each function as a shield to absorb an unwanted magnetic flux.

The underlayer 74 and the nonmagnetic cap layer 84 are each formed of a nonmagnetic conductive material. The underlayer 74 contains at least one of Ta and Ru, for example. The nonmagnetic cap layer 84 is formed of NiCr, for example.

The antiferromagnetic layers 75 and 85 are each formed of an antiferromagnetic material. The antiferromagnetic material to be used for the antiferromagnetic layers 75 and 85 may be a non-heat-induced antiferromagnetic material or a heat-induced antiferromagnetic material. Examples of the non-heat-induced antiferromagnetic material include a Mn alloy that has a γ phase, such as FeMn or IrMn. Examples of the heat-induced antiferromagnetic material include a Mn alloy that has a regular crystal structure, such as PtMn or NiMn.

In the first read shield portion 3, the first single magnetic domain layer 76 is exchange-coupled to the first antiferromagnetic layer 75, whereby the first single magnetic domain layer 76 is brought into a single magnetic domain state so that the magnetization of the first single magnetic domain layer 76 is directed to a certain direction. The first single magnetic domain layer 76 corresponds to the first single magnetic domain portion of the present invention.

Similarly, in the second read shield portion 8, the second single magnetic domain layer 86 is exchange-coupled to the second antiferromagnetic layer 85, whereby the second single magnetic domain layer 86 is brought into a single magnetic domain state so that the magnetization of the second single magnetic domain layer 86 is directed to a certain direction. The second single magnetic domain layer 86 corresponds to the second single magnetic domain portion of the present invention.

The directions of the magnetizations of the first and second single magnetic domain layers 76 and 86 are set by annealing in a magnetic field, and are determined by the direction of the magnetic field at that time. Therefore, the magnetizations of the first and second single magnetic domain layers 76 and 86 are in the same direction. Specifically, the directions of the magnetizations of the first and second single magnetic domain layers 76 and 86 are the same and are parallel to the track width direction TW. The MR stack 5, the two flux guide layers 90 and the bias magnetic field applying layer 6 are disposed between the first and second single magnetic domain layers 76 and 86.

Figure 26:
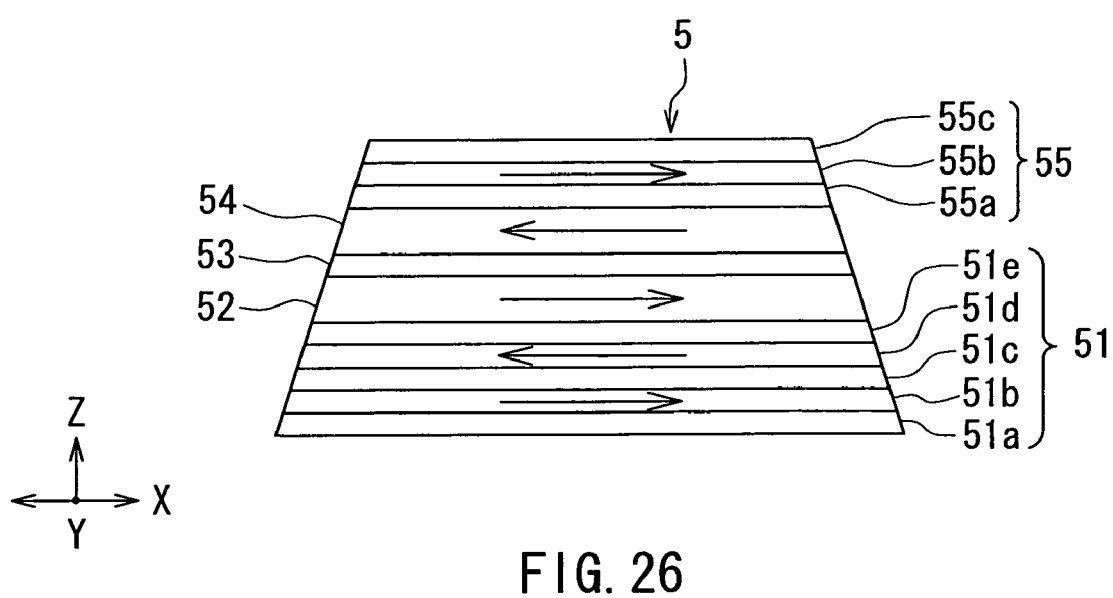
FIG. 26 is an enlarged cross-sectional view of the MR stack of FIG. 25.

As shown in FIG. 26, in the MR stack 5 of the second embodiment, the first coupling layer 51 includes a nonmagnetic conductive layer 51a, a magnetic layer 51b, a nonmagnetic conductive layer 51c, a magnetic layer 51d and a nonmagnetic conductive layer 51e that are stacked in this order on the first single magnetic domain layer 76. The nonmagnetic conductive layers 51a, 51c and 51e are each formed of a nonmagnetic conductive material containing at least one of Ru, Rh, Ir, Cr, Cu, Ag, Au, Pt and Pd, for example. The magnetic layers 51b and 51d are each formed of a magnetic material such as NiFe, CoFe, CoFeB, CoFeNi or FeN. The top surface of the nonmagnetic conductive layer 51e touches the bottom surface of the first ferromagnetic layer 52. The top surface of the nonmagnetic conductive layer 55c of the second coupling layer 55 touches the bottom surface of the second single magnetic domain layer 86. The remainder of configuration of the MR stack 5 of the second embodiment is the same as that of the first embodiment.

In the second embodiment, the first single magnetic domain layer 76 and the magnetic layer 51b are antiferromagnetically coupled to each other by the RKKY interaction through the nonmagnetic conductive layer 51a. The magnetic layers 51b and 51d are antiferromagnetically coupled to each other by the RKKY interaction through the nonmagnetic conductive layer 51c. The magnetic layer 51d and the first ferromagnetic layer 52 are antiferromagnetically coupled to each other by the RKKY interaction through the nonmagnetic conductive layer 51e. As a result, the magnetizations of the first ferromagnetic layer 52 and the first single magnetic domain layer 76 are directed antiparallel to each other.

In addition, in the second embodiment, the second single magnetic domain layer 86 and the magnetic layer 55b are antiferromagnetically coupled to each other by the RKKY interaction through the nonmagnetic conductive layer 55c, while the magnetic layer 55b and the second ferromagnetic layer 54 are antiferromagnetically coupled to each other by the RKKY interaction through the nonmagnetic conductive layer 55a. As a result, the magnetizations of the second ferromagnetic layer 54 and the second single magnetic domain layer 86 are directed to the same direction.

In the second embodiment, since the directions of the magnetizations of the first single magnetic domain layer 76 and the second single magnetic domain layer 86 are the same, the directions of the magnetizations of the first ferromagnetic layer 52 and the second ferromagnetic layer 54 are antiparallel to each other.

The remainder of configuration of the MR element of the second embodiment is the same as that of the first embodiment. The advantageous effects of the MR element of the second embodiment were confirmed by experiment as in the first embodiment. The method of the experiment is the same as that for the first embodiment. The MR elements of Example used in the experiment each have the configuration of the MR element of the second embodiment. The MR elements of Comparative Example are each provided with the two nonmagnetic layers 190 instead of the two flux guide layers 90 of the second embodiment.

The experimental results showed that the percentage of the defective elements in the 200 MR elements of Example was 3%, whereas the percentage of the defective elements in the 200 MR elements of Comparative Example was 38%. This indicates that the second embodiment is capable of suppressing the occurrence of abrupt changes in output of the MR element, like the first embodiment. Furthermore, measurement of the read effective track width for each of the MR elements of Example and Comparative Example showed that the read effective track width of the MR element of Example was smaller than that of the MR element of Comparative Example by about 10%.

For the second embodiment, a magnetic layer and a nonmagnetic conductive layer may be provided between the antiferromagnetic layer 75 and the single magnetic domain layer 76 such that the magnetic layer is located closer to the antiferromagnetic layer 75 than is the nonmagnetic conductive layer, and the magnetic layer may be exchange-coupled to the antiferromagnetic layer 75 while being antiferromagnetically coupled to the single magnetic domain layer 76 by the RKKY interaction through the nonmagnetic conductive layer. In this case, the directions of the magnetizations of the single magnetic domain layers 76 and 86 become antiparallel to each other. In this case, it is therefore possible to form the MR stack 5 in the same configuration as the first embodiment.

As an alternative to the above-described configuration, a magnetic layer and a nonmagnetic conductive layer may be provided between the antiferromagnetic layer 85 and the single magnetic domain layer 86 such that the magnetic layer is located closer to the antiferromagnetic layer 85 than is the nonmagnetic conductive layer, and the magnetic layer may be exchange-coupled to the antiferromagnetic layer 85 while being antiferromagnetically coupled to the single magnetic domain layer 86 by the RKKY interaction through the nonmagnetic conductive layer. In this case also, the directions of the magnetizations of the single magnetic domain layers 76 and 86 become antiparallel to each other, and it is therefore possible to form the MR stack 5 in the same configuration as the first embodiment.

The remainder of configuration, functions and advantageous effects of the second embodiment are similar to those of the first embodiment.

Third Embodiment

Figure 27:
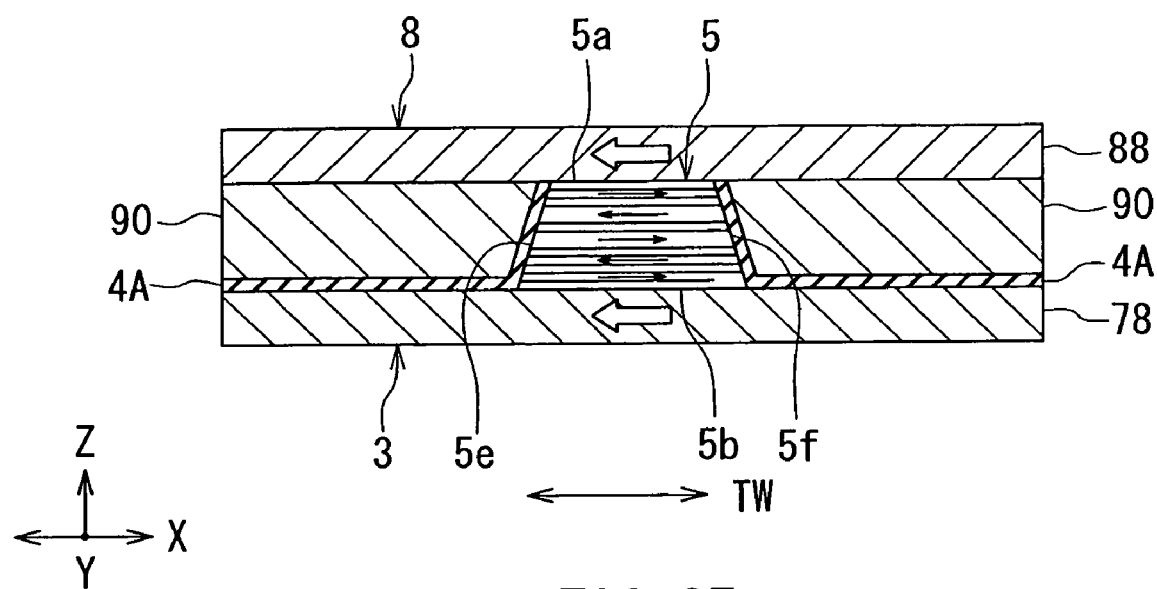
FIG. 27 is a cross-sectional view showing a cross section of a magnetoresistive element of a third embodiment of the invention parallel to the medium facing surface.

An MR element of a third embodiment of the invention will now be described with reference to FIG. 27. In the MR element of the third embodiment, the first and second read shield portions 3 and 8 and the MR stack 5 have configurations different from those of the first embodiment. FIG. 27 is a cross-sectional view showing a cross section of the MR element of the third embodiment parallel to the medium facing surface 40. The X, Y and Z directions shown in FIG. 21 are also shown in FIG. 27. In FIG. 27, the Y direction is orthogonal to the X and Z directions. In FIG. 27, arrows in the layers show the directions of the magnetizations of the layers.

As shown in FIG. 27, the first read shield portion 3 of the third embodiment is composed of a first shield layer 78 disposed on the insulating layer 2 (see FIG. 12 and FIG. 13). The second read shield portion 8 of the third embodiment is composed of a second shield layer 88 disposed on the MR stack 5, the two flux guide layers 90, the protection layer 61, the insulating films 4A and 4B and the insulating refill layer 7. The MR stack 5, the two flux guide layers 90 and the bias magnetic field applying layer 6 are disposed between the first shield layer 78 and the second shield layer 88.

The shield layers 78 and 88 are each formed of a magnetic material. Specific examples of the material of the shield layers 78 and 88 include NiFe, CoZrTa, sendust, CoFeNi and CoZrNb. The shield layers 78 and 88 each function as a shield to absorb an unwanted magnetic flux.

In the third embodiment, each of the shield layers 78 and 88 is long in the track width direction TW, thereby having a magnetic shape anisotropy that orients the easy axis of magnetization to the track width direction TW. The magnetic shape anisotropy brings each of the shield layers 78 and 88 into a single magnetic domain state such that the magnetization thereof is directed parallel to the track width direction TW. The shield layer 78 corresponds to the first single magnetic domain portion of the present invention, and the shield layer 88 corresponds to the second single magnetic domain portion of the present invention. FIG. 27 shows an example in which the directions of the magnetizations of the shield layers 78 and 88 are the same. However, the directions of the magnetizations of the shield layers 78 and 88 may be antiparallel to each other.

To obtain a magnetic shape anisotropy of sufficient magnitude for bringing the shield layers 78 and 88 into a single magnetic domain state, each of the shield layers 78 and 88 preferably has such a shape that the dimension of each of the shield layers 78 and 88 taken in the track width direction TW is 10 or more times greater than the dimension of each of the shield layers 78 and 88 taken in the direction perpendicular to the medium facing surface 40 (the Y direction). By way of example, the dimension of each of the shield layers 78 and 88 taken in the track width direction TW is about 30 µm, and the dimension of each of the shield layers 78 and 88 taken in the direction perpendicular to the medium facing surface 40 (the Y direction) is about 3 µm. The thickness (the dimension taken in the Z direction) of each of the shield layers 78 and 88 is about 20 nm to 3 µm, for example.

The case where the directions of the magnetizations of the shield layers 78 and 88 are the same as shown in FIG. 27 will now be described. The configuration of the MR stack 5 in this case is as shown in FIG. 26, for example. In this case, the first shield layer 78 and the magnetic layer 51b are antiferromagnetically coupled to each other by the RKKY interaction through the nonmagnetic conductive layer 51a, the magnetic layers 51b and 51d are antiferromagnetically coupled to each other by the RKKY interaction through the nonmagnetic conductive layer 51c, and the magnetic layer 51d and the first ferromagnetic layer 52 are antiferromagnetically coupled to each other by the RKKY interaction through the nonmagnetic conductive layer 51e. As a result, the magnetizations of the first ferromagnetic layer 52 and the first shield layer 78 are directed antiparallel to each other.

Furthermore, the second shield layer 88 and the magnetic layer 55b are antiferromagnetically coupled to each other by the RKKY interaction through the nonmagnetic conductive layer 55c, and the magnetic layer 55b and the second ferromagnetic layer 54 are antiferromagnetically coupled to each other by the RKKY interaction through the nonmagnetic conductive layer 55a. As a result, the magnetizations of the second ferromagnetic layer 54 and the second shield layer 88 are directed to the same direction. Consequently, the magnetizations of the first ferromagnetic layer 52 and the second ferromagnetic layer 54 are directed antiparallel to each other.

The remainder of configuration of the MR element of the third embodiment is the same as that of the first embodiment. The advantageous effects of the MR element of the third embodiment were confirmed by experiment as in the first embodiment. The method of the experiment is the same as that for the first embodiment. The MR elements of Example used in the experiment each have the configuration of the MR element of the third embodiment. The MR elements of Comparative Example are each provided with the two nonmagnetic layers 190 instead of the two flux guide layers 90 of the third embodiment.

The experimental results showed that the percentage of the defective elements in the 200 MR elements of Example was 9%, whereas the percentage of the defective elements in the 200 MR elements of Comparative Example was 55%. This indicates that the third embodiment is capable of suppressing the occurrence of abrupt changes in output of the MR element, like the first embodiment. Furthermore, measurement of the read effective track width for each of the MR elements of Example and Comparative Example showed that the read effective track width of the MR element of Example was smaller than that of the MR element of Comparative Example by about 10%.

In the third embodiment, the directions of the magnetizations of the shield layers 78 and 88 may be antiparallel to each other, as previously mentioned. In this case, it is possible to form the MR stack 5 in the same configuration as the first embodiment.

The remainder of configuration, functions and advantageous effects of the third embodiment are similar to those of the first embodiment.

The present invention is not limited to the foregoing embodiments but can be carried out in various modifications. For example, methods for bringing the first and second single magnetic domain portions into a single magnetic domain state are not limited to those shown in the first to third embodiments. For example, each of the first and second single magnetic domain portions may be brought into a single magnetic domain state by using a hard magnetic layer.

While each of the foregoing embodiments has shown an example in which the spacer layer is a tunnel barrier layer, the spacer layer of the present invention may be a nonmagnetic conductive layer, or may be a spacer layer of the current-confined-path type that includes a portion allowing the passage of currents and a portion intercepting the passage of currents.

While the foregoing embodiments have been described with reference to a thin-film magnetic head having a structure in which the read head is formed on the base body and the write head is stacked on the read head, the read head and the write head may be stacked in the reverse order. If the thin-film magnetic head is to be used only for read operations, the thin-film magnetic head may be configured to include the read head only.

The present invention is applicable not only to MR elements used as read heads of thin-film magnetic heads, but also to MR elements used for various purposes in general.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetoresistive element comprising:
    a first shield portion and a second shield portion;
    an MR stack disposed between the first and second shield portions; and
    a bias magnetic field applying layer disposed between the first and second shield portions and applying a bias magnetic field to the MR stack, wherein:
    the first shield portion includes a first single magnetic domain portion that is in a single magnetic domain state such that a magnetization thereof is directed to a first direction;
    the second shield portion includes a second single magnetic domain portion that is in a single magnetic domain state such that a magnetization thereof is directed to a second direction;
    the first and second single magnetic domain portions and the MR stack are disposed such that the MR stack is sandwiched between the first and second single magnetic domain portions;
    the MR stack includes: a first ferromagnetic layer magnetically coupled to the first single magnetic domain portion; a second ferromagnetic layer magnetically coupled to the second single magnetic domain portion; and a spacer layer made of a nonmagnetic material and disposed between the first and second ferromagnetic layers; and
    the MR stack has a front end face that receives a magnetic field to be detected, a rear end face opposite to the front end face, and two side surfaces connecting the front end face and the rear end face to each other, each of the front end face, the rear end face and the two side surfaces being located at an end in a direction intersecting a direction in which the first ferromagnetic layer, the spacer layer and the second ferromagnetic layer are stacked,
    the magnetoresistive element further comprising two flux guide layers each formed of a magnetic material, the two flux guide layers being disposed between the first and second single magnetic domain portions and respectively adjacent to the two side surfaces of the MR stack,
    wherein each of the two flux guide layers has a front end face facing toward the same direction as the front end face of the MR stack, and a rear end face opposite to the front end face; and
    the bias magnetic field applying layer has a front end face facing the rear end face of the MR stack and the rear end face of each of the two flux guide layers, and applies the bias magnetic field to the first and second ferromagnetic layers so that magnetizations of the first and second ferromagnetic layers change their directions compared with a state in which no bias magnetic field is applied to the first and second ferromagnetic layers.

2. The magnetoresistive element according to claim 1, wherein the first direction and the second direction are antiparallel to each other.

3. The magnetoresistive element according to claim 1, wherein the bias magnetic field applying layer applies the bias magnetic field to the first and second ferromagnetic layers so that the magnetizations of the first and second ferromagnetic layers are directed orthogonal to each other.

4. The magnetoresistive element according to claim 1, wherein the MR stack further includes: a first coupling layer disposed between the first single magnetic domain portion and the first ferromagnetic layer and magnetically coupling the first ferromagnetic layer to the first single magnetic domain portion; and a second coupling layer disposed between the second single magnetic domain portion and the second ferromagnetic layer and magnetically coupling the second ferromagnetic layer to the second single magnetic domain portion.

5. The magnetoresistive element according to claim 4, wherein each of the first and second coupling layers includes a nonmagnetic conductive layer.

6. The magnetoresistive element according to claim 4, wherein at least one of the first and second coupling layers includes a magnetic layer, and two nonmagnetic conductive layers sandwiching the magnetic layer.

7. A thin-film magnetic head comprising: a medium facing surface that faces toward a recording medium; and the magnetoresistive element according to claim 1, the magnetoresistive element being disposed near the medium facing surface to detect a signal magnetic field sent from the recording medium.

8. A head assembly comprising: a slider including a thin-film magnetic head and disposed to face toward a recording medium; and a supporter flexibly supporting the slider, the thin-film magnetic head comprising: a medium facing surface that faces toward the recording medium; and the magnetoresistive element according to claim 1, the magnetoresistive element being disposed near the medium facing surface to detect a signal magnetic field sent from the recording medium.

9. A magnetic disk drive comprising: a slider including a thin-film magnetic head and disposed to face toward a recording medium that is driven to rotate; and an alignment device supporting the slider and aligning the slider with respect to the recording medium, the thin-film magnetic head comprising: a medium facing surface that faces toward the recording medium; and the magnetoresistive element according to claim 1, the magnetoresistive element being disposed near the medium facing surface to detect a signal magnetic field sent from the recording medium.

* * * * *